(12) United States Patent
Imoto et al.

(10) Patent No.: US 10,235,776 B2
(45) Date of Patent: Mar. 19, 2019

(54) INFORMATION PROCESSING DEVICE, INFORMATION PROCESSING METHOD, AND INFORMATION PROCESSING PROGRAM

(71) Applicant: KABUSHIKI KAISHA TOSHIBA, Tokyo (JP)

(72) Inventors: Kazunori Imoto, Kanagawa (JP); Shihomi Takahashi, Kanagawa (JP); Osamu Yamaguchi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/252,428

(22) Filed: Aug. 31, 2016

(65) Prior Publication Data

US 2017/0069137 A1    Mar. 9, 2017

(30) Foreign Application Priority Data

Sep. 7, 2015  (JP) .................................. 2015-175827

(51) Int. Cl.
*G06T 19/00*    (2011.01)
*G06T 11/00*    (2006.01)

(52) U.S. Cl.
CPC .................................. *G06T 11/00* (2013.01)

(58) Field of Classification Search
None
See application file for complete search history.

(56) References Cited

U.S. PATENT DOCUMENTS

| 6,828,964 | B2 | 12/2004 | Fujita et al. |
| 2011/0254861 | A1 | 10/2011 | Emura et al. |
| 2014/0292810 | A1* | 10/2014 | Tsurumi ................... G06T 11/00 345/633 |
| 2014/0306881 | A1 | 10/2014 | Sugihara et al. |
| 2014/0306996 | A1* | 10/2014 | Cao ........................ G06T 19/006 345/633 |
| 2014/0313223 | A1 | 10/2014 | Koga |

(Continued)

FOREIGN PATENT DOCUMENTS

| JP | 2003-167659 | 6/2003 |
| JP | 2012-198668 | 10/2012 |

(Continued)

*Primary Examiner* — Yingchun He
(74) *Attorney, Agent, or Firm* — Nixon & Vanderhye, P.C.

(57) ABSTRACT

According to one embodiment, an information processing device includes processing circuitry. The circuitry acquires a first picture including a first object and a second object; and acquires a second picture including the first object and an object different from the first object. The circuitry generates first data to display first associated information; and generates second data to display the first associated information superimposed onto the second picture in response to a change between a first positional relationship in the first picture and a second positional relationship in the second picture, the first positional relationship being a relative positional relationship between the first and second objects in the first picture. The second positional relationship is a relative positional relationship between the first object and the object different from the first object in the second picture.

14 Claims, 19 Drawing Sheets

(56) References Cited

U.S. PATENT DOCUMENTS

| | | | |
|---|---|---|---|
| 2015/0002540 A1* | 1/2015 | De | G06T 19/006 345/633 |
| 2015/0052479 A1 | 2/2015 | Ooi et al. | |
| 2015/0371399 A1 | 12/2015 | Tonouchi et al. | |

FOREIGN PATENT DOCUMENTS

| | | |
|---|---|---|
| JP | 2013-218597 | 10/2013 |
| JP | 2014-206904 | 10/2014 |
| JP | 2014-215646 | 11/2014 |
| JP | 2016-004553 | 1/2016 |
| WO | 2010/073616 | 7/2010 |

* cited by examiner

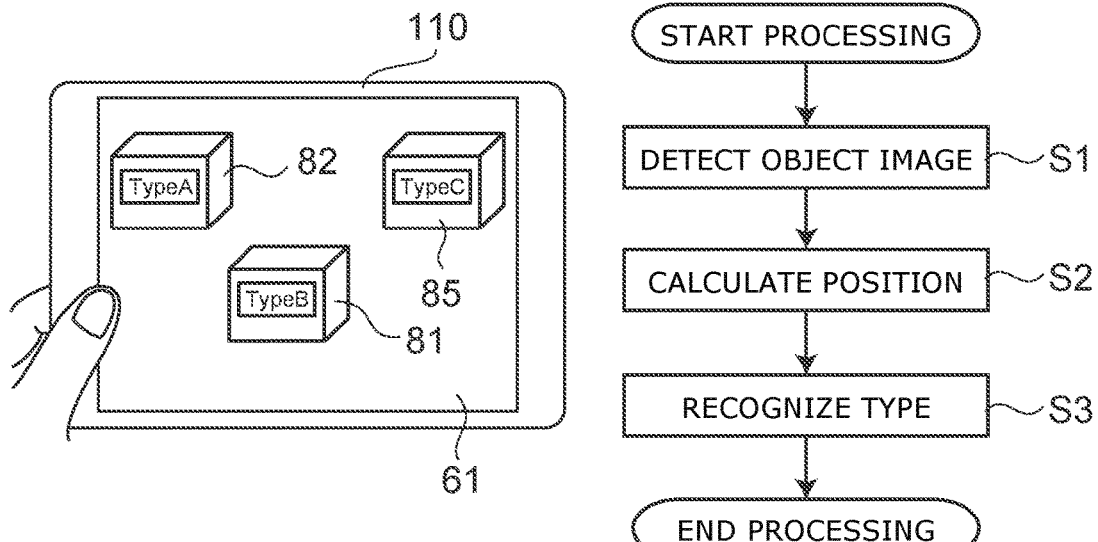
FIG. 4A    FIG. 4B
| TYPE KEY | ASSOCIATED INFORMATION | 40a |
|---|---|---|
| TypeA | PLEASE CONFIRM IF METER IS IN NORMAL RANGE | 42 |
| TypeB | THIS IS THE INITIAL DEVICE TO BE CHECKED | 41 |
| TypeC | PLEASE CONFIRM IF SWITCH IS ON | 43 |
| TypeD | | |
| ... | | |
FIG. 5A
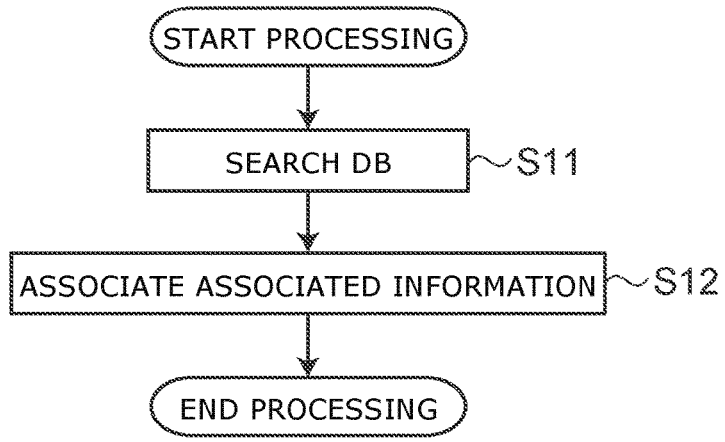
FIG. 5B

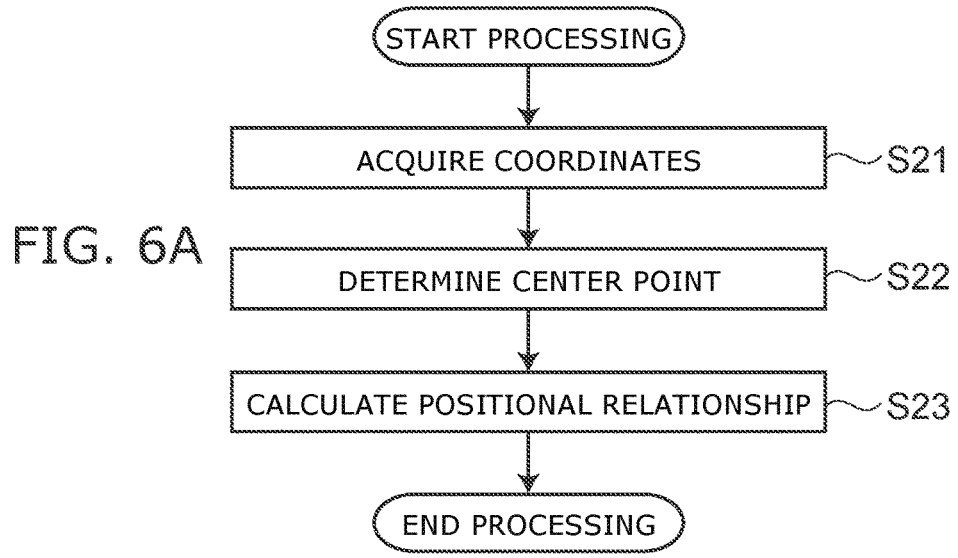
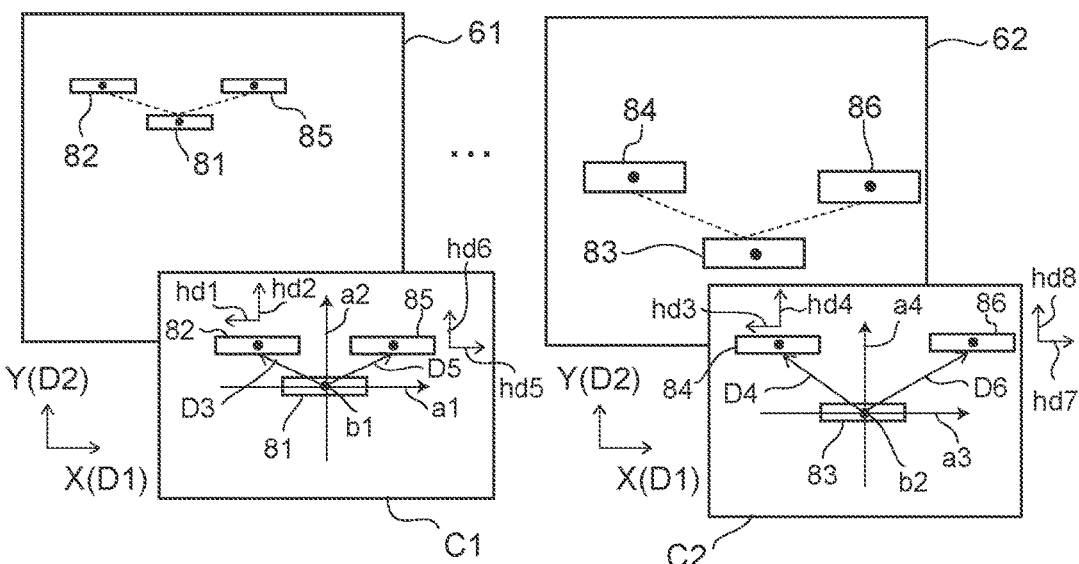

FIG. 19A
| TYPE KEY | ASSOCIATED INFORMATION | 40a |
|---|---|---|
| UNDER 10 | EVENT XXX FOR CHILDREN STARTS IN 30 MINUTES. PLEASE INVITE. | 44 |
| 60 AND ABOVE | PLEASE INFORM THAT YYY CAN BE UTILIZED AS RESTING ROOM FOR HEATSTROKE PREVENTION | |
| MALE AND FEMALE 20 OR ABOVE | PLEASE INFORM THAT THERE IS A SPECIAL MENU FOR COUPLES IN THE EVENING | |
| ... | | |
FIG. 19B
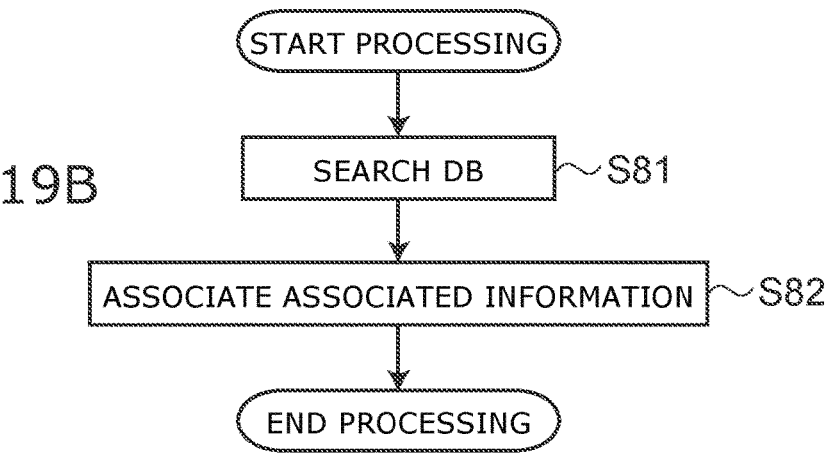
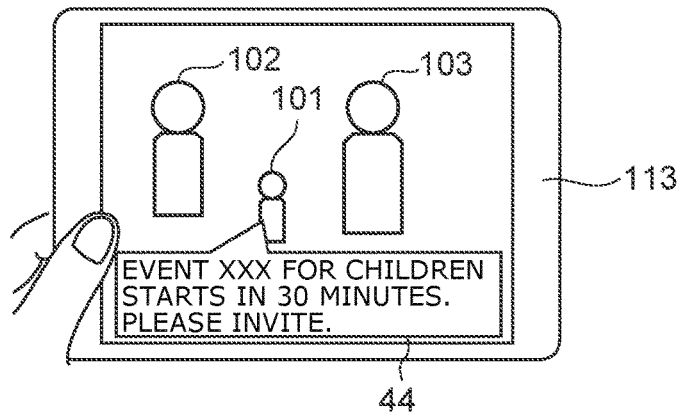
FIG. 20

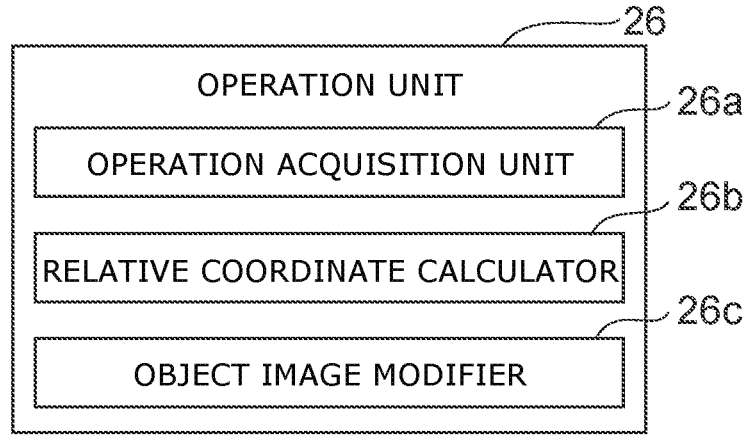
FIG. 22A
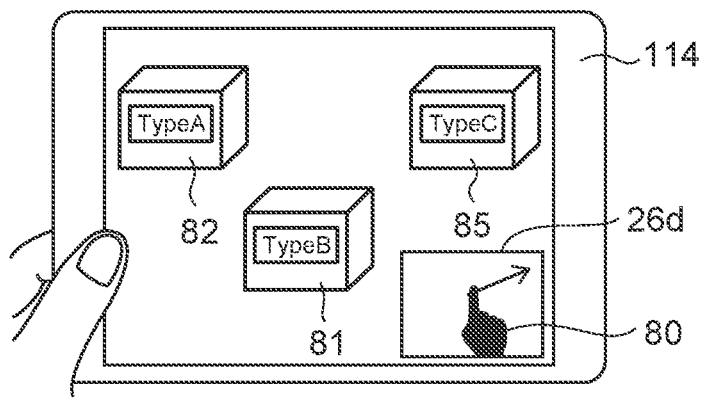
FIG. 22B
| CENTER | TypeB |
|---|---|
| DIRECTION (-,-) | NONE |
| DIRECTION (-,+) | TypeA |
| DIRECTION (+,+) | TypeC |
| DIRECTION (+,-) | NONE |
FIG. 22C

INFORMATION PROCESSING DEVICE, INFORMATION PROCESSING METHOD, AND INFORMATION PROCESSING PROGRAM

CROSS-REFERENCE TO RELATED APPLICATIONS

This application is based upon and claims the benefit of priority from Japanese Patent Application No. 2015-175827, filed on Sep. 7, 2015; the entire contents of which are incorporated herein by reference.

FIELD

Embodiments described herein relate generally to an information processing device, an information processing method, and an information processing program.

BACKGROUND

There are AR (Augmented Reality) applications in which associated information relating to an object provided in real space is displayed by being superimposed onto a picture. The AR application is used by being installed in an information processing device. It is desirable for the associated information displayed in the information processing device to be easy to view.

BRIEF DESCRIPTION OF THE DRAWINGS

FIG. 4A and FIG. 4B show operations of the detector according to the first embodiment;

FIG. 5A and FIG. 5B show operations of the association unit according to the first embodiment;

FIG. 6A to FIG. 6D show operations of the calculator according to the first embodiment;

FIG. 19A and FIG. 19B show operations of the association unit according to the fourth embodiment;

FIG. 20 is a schematic view showing the display result of the associated information according to the fourth embodiment;

FIG. 22A to FIG. 22C show an application example of the information processing device according to the fifth embodiment;

DETAILED DESCRIPTION

According to one embodiment, an information processing device includes processing circuitry. The processing circuitry is configured to acquire a first picture captured at a first time. The first picture includes a first object and a second object. The processing circuitry is configured to acquire a second picture captured at a second time being later than the first time. The second picture includes the first object and an object different from the first object. The processing circuitry is configured to generate first data to display first associated information superimposed onto the first picture. The first associated information corresponds to the first object in the first picture. The processing circuitry is configured to generate second data to display the first associated information superimposed onto the second picture in response to a change between a first positional relationship in the first picture and a second positional relationship in the second picture. The first positional relationship is a relative positional relationship between the first object and the second object in the first picture. The second positional relationship is a relative positional relationship between the first object and the object different from the first object in the second picture.

According to one embodiment, an information processing method includes acquiring a first picture captured at a first time. The first picture includes a first object and a second object. The method includes acquiring a second picture captured at a second time being later than the first time. Thee second picture includes the first object and an object different from the first object. The method includes generating first data to display first associated information superimposed onto the first picture. The first associated information corresponds to the first object in the first picture. The method includes generating second data to display the first associated information superimposed onto the second picture in response to a change between a first positional relationship in the first picture and a second positional relationship in the second picture. The first positional relationship is a relative positional relationship between the first object and the second object in the first picture. The second positional relationship is a relative positional relationship between the first object and the object different from the first object in the second picture.

First Embodiment

Figure 1:
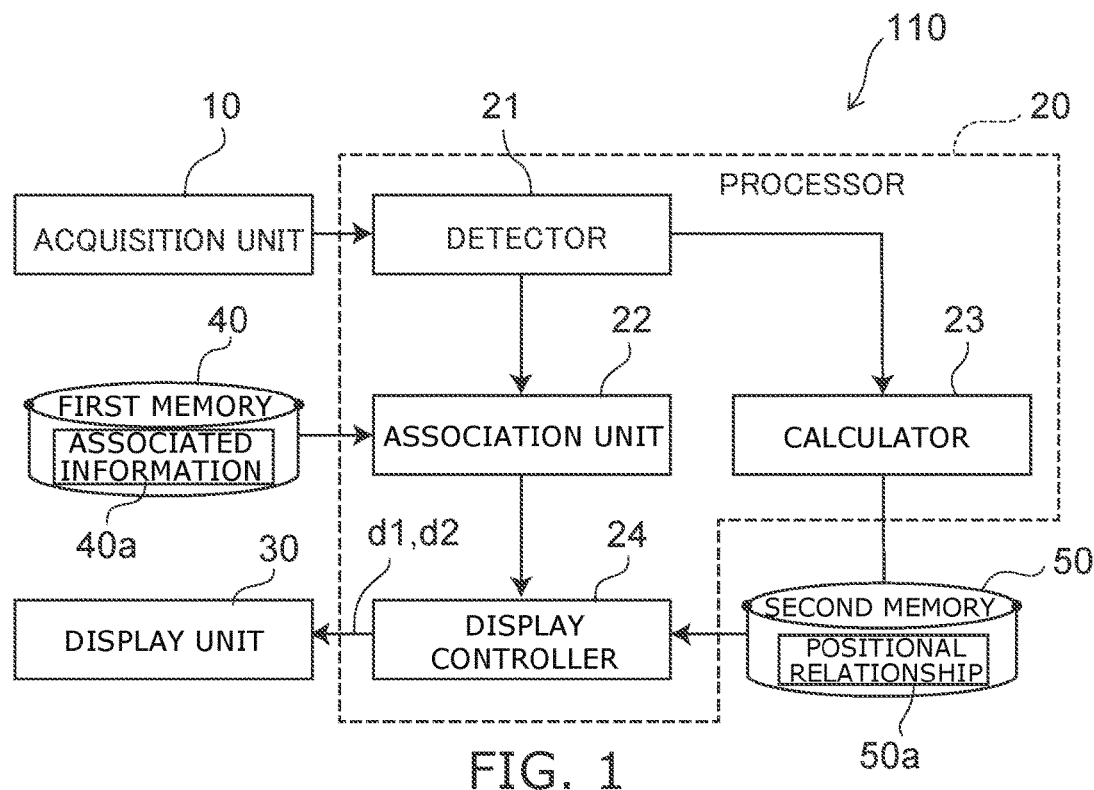
FIG. 1 is a block diagram showing an information processing device according to a first embodiment.

FIG. 1 is a block diagram showing an information processing device according to a first embodiment.

As shown in FIG. 1, the information processing device 110 according to the embodiment includes an acquisitor 10, a processor 20, a display unit 30, first memory 40, and second memory 50. The acquisitor 10 includes, for example, input/output terminals. The acquisitor 10 includes an input/output interface that communicates with the outside via a wired or wireless method. The processor 20 includes, for example, a calculating device including a CPU (Central Processing Unit), memory, etc. A portion of each block or each entire block of the processor 20 may include an integrated circuit such as LSI (Large Scale Integration), etc., or an IC (Integrated Circuit) chipset. Each block may include an individual circuit; or a circuit in which some or all of the blocks are integrated may be used. The blocks may be provided as one body; or some blocks may be provided separately. Also, for each block, a portion of the block may be provided separately. The integration is not limited to LSI; and a dedicated circuit or a general-purpose processor may be used.

A detector 21, an association unit 22, a calculator 23, and a display controller 24 are provided in the processor 20. For example, these components are realized as an image processing program. In other words, the information processing device 110 also may be realized by using a general-purpose computer device as the basic hardware. The functions of each component included in the information processing device 110 may be realized by causing a processor mounted in the computer device recited above to execute the image processing program. In such a case, the information processing device 110 may be realized by preinstalling the image processing program recited above in the computer device; or the information processing device 110 may be realized by storing the image processing program recited above in a storage medium such as CD-ROM, etc., or distributing the image processing program recited above via a network and appropriately installing the image processing program in the computer device. The processor 20 also may be realized by appropriately utilizing a storage medium such as memory, a hard disk, CD-R, CD-RW, DVD-RAM, DVD-R, etc., connected externally or built into the computer device recited above.

Although the first memory 40 and the second memory 50 are shown separately in the example, the first memory 40 and the second memory 50 may be configured as one memory.

Figure 2:
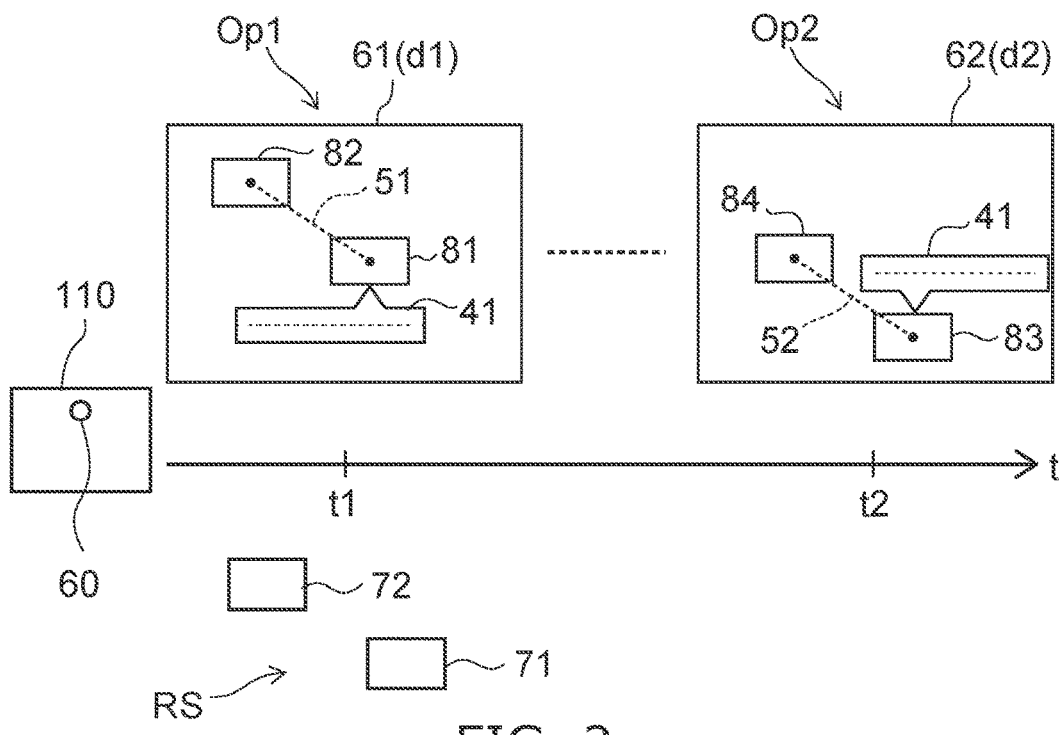
FIG. 2 is a schematic view showing relationships between the objects and the pictures.

FIG. 2 is a schematic view showing relationships between the objects and the pictures.

As shown in FIG. 2, an imaging unit 60 such as a digital still camera or the like is provided as one body with the information processing device 110. The imaging unit 60 may be provided as a separate body from the information processing device 110. The imaging unit 60 images a first object 71 and a second object 72 provided in real space RS and generates a first picture 61 and a second picture 62. The acquisitor 10 acquires the first picture 61 and the second picture 62. The first picture 61 and the second picture 62 each may be one of a video image or a still image.

The first picture 61 is a picture at a first time t1. The first picture 61 includes a first image 81 of the first object 71 and a second image 82 of the second object 72. The second picture 62 is a picture at a second time t2 after the first time t1. The second picture 62 includes a third image 83 of the first object 71, and a fourth image 84 that is different from the third image 83. In the example, the first image 81 and the third image 83 both are images of the first object 71. The second image 82 and the fourth image 84 both are images of the second object 72.

In the embodiment, the processor 20 implements a first operation Op1 and a second operation Op2. The first operation Op1 generates first data d1 that displays first associated information 41 associated with the first image 81 to be superimposed onto the first picture 61. The second operation Op2 generates second data d2 that displays the first associated information 41 superimposed onto the second picture 62 when the state of the change between a first positional relationship 51 and a second positional relationship 52 is a first state. The first positional relationship 51 is the relative positional relationship of the second image 82 having the first image 81 as the reference. The second positional relationship 52 is the relative positional relationship of the fourth image 84 having the third image 83 as the reference. The first state includes, for example, the state in which there is no change between the first positional relationship 51 and the second positional relationship 52 or the state in which the change is small. In other words, the first state includes the state in which the first positional relationship 51 and the second positional relationship 52 substantially do not change.

More specifically, the detector 21 implements first detection processing. In the first detection processing, the first image 81 and the second image 82 are detected from the first picture 61. The association unit 22 implements association processing. In the association processing, the first associated information 41 that relates to the first object 71 is associated with the first image 81. The calculator 23 implements first calculation processing. In the first calculation processing, the relative first positional relationship 51 of the second image 82 having the first image 81 as the reference is calculated. The display controller 24 implements first display control processing. In the first display control processing, the first data d1 that displays the first associated information 41 superimposed onto the first picture 61 is generated.

The detector 21 further implements second detection processing. In the second detection processing, the third image 83 and the fourth image 84 are detected from the second picture 62. The calculator 23 implements second calculation processing. In the second calculation processing, the relative second positional relationship 52 of the fourth image 84 having the third image 83 as the reference is calculated. The display controller 24 implements second display control processing. In the second display control processing, the second data d2 that displays the first associated information 41 superimposed onto the second picture 62 is generated when the state of the change between the first positional relationship 51 and the second positional relationship 52 is the first state. The display unit 30 performs the display of the first picture 61 and the second picture 62.

Thus, according to the embodiment, in the first picture 61, the relative positional relationship (the first positional relationship 51) between the object image (the first image 81, also called the object image of interest hereinbelow) for which the associated information is displayed and the object image (the second image 82) around the object image for which the associated information is displayed is determined using, as the reference, the object image for which the associated information is displayed. In the second picture 62, the relative positional relationship (the second positional relationship 52) between the third image 83 and the object image (the fourth image 84) around the third image 83 is determined using the third image 83 as the reference. If these positional relationships substantially do not change, the display of the associated information (the first associated information 41) of the object image of interest is continued.

The information processing device 110 according to the embodiment images the objects existing in real space using a camera, etc.; and AR application software that displays the associated information relating to the object to be superimposed is applied to the pictures that are imaged. The associated information is a wide variety of information relating to the object and includes, for example, an operation method for the object, accompanying information that can be acquired via the Internet or the like, etc.

Here, in the case where the picture includes object images of many objects, the picture is extremely difficult to view if the associated information is displayed superimposed for each of the object images. Conversely, there is a reference example in which the object image used as the object image of interest is the object image most proximal to the center of the angle of view of the camera (the center of the picture) or most proximal to the portion corresponding to the line of sight of the user; and only the associated information of the object image of interest is displayed.

However, in the reference example recited above, when the associated information is displayed for multiple pictures imaged continuously, the center of the angle of view of the camera or the line of sight of the user may move frequently as the user moves, etc. In such a case, the object image of interest changes moment by moment; the associated information that is displayed is switched frequently; and the viewing is difficult.

Conversely, according to the embodiment, the relative positional relationships between the object image of interest and the object images around the object image of interest are determined for the multiple pictures; and if these positional relationships substantially do not change, the display of the associated information of the object image of interest is continued. Therefore, as the user moves, etc., the associated information that is displayed is not switched frequently; and the display of the associated information can be easy to view.

In other words, as shown in FIG. 1 and FIG. 2, the acquisitor 10 acquires the multiple pictures (e.g., the first picture 61 and the second picture 62) of the images of the objects existing in the real space RS, and outputs the multiple pictures that are acquired to the detector 21. The acquisitor 10 may acquire the pictures in real time from the imaging unit 60 such as the digital still camera, etc. The acquisitor 10 may acquire image data recorded in a storage medium such as a HDD (Hard Disk Drive), etc., by reading. For example, digital image data in which the pictures input from the imaging unit 60 are converted is recorded in the storage medium.

The detector 21 analyzes the first picture 61 input from the acquisitor 10, detects the object images included inside the first picture 61, outputs the positions of the object images to the calculator 23, and outputs the types of the object images to the association unit 22. Here, the object image may include, for example, the character information of a signboard, a logo, a sign, an identification plate, etc. The object image may include, for example, the shape information of an object such as a product disposed in a shop, a building on a street, a machine installed in a plant, etc. The object image may further include, for example, information relating to a human or a human face.

The positions of the object images output by the detector 21 are expressed as coordinate information where the object images are positioned inside the picture. The coordinate information of the objects at this time may be set to strictly surround the object images or may be simplified by using circumscribing rectangles, centroid coordinates, etc. The types of the object images output by the detector 21 are information for discriminating from the other object images. For example, character recognition of an object image including character information may be performed; and the character strings that are obtained may be used as the type of the object image. Shape recognition of an object image including shape information of the object may be performed; and the object shape that is obtained may be used as the type of the object image. An image portion that is cut out from the object image may be used as the type.

Based on the types of the object images input from the detector 21, the association unit 22 selects the associated information corresponding to the types of the object images from associated information 40*a* stored in the first memory 40 and outputs the selected associated information to the display controller 24. For example, the first associated information 41 is associated with the first image 81. The associated information 40*a* is information such as characters corresponding to the objects (the object images), etc. For example, in an AR application that translates Japanese characters into English characters, the English characters of the translation result correspond to the associated information. In an AR application that displays an operation method for a device, pictures of the operation manual describing the operation method of the device, pictures that show the general concept of the operation, etc., correspond to the associated information. The associated information 40*a* is not particularly limited; and it is sufficient for the associated information 40*a* to be anything associated with the object that can be displayed superimposed onto the acquired picture.

The calculator 23 calculates a relative positional relationship 50*a* of the multiple object images based on the positions of the multiple object images input from the detector 21 and records the calculated positional relationship 50*a* in the second memory 50. For example, the relative first positional relationship 51 between the first image 81 and the second image 82 included in the first picture 61 is included in the positional relationship 50*a*. Here, the first image 81 is set as the object image of interest. The first positional relationship 51 is the relative positional relationship of the second image 82 having the first image 81 as the reference.

The display controller 24 generates the first data d1 that displays the first associated information 41 associated with the first image 81 superimposed onto the first picture 61. Then, the display controller 24 controls the display unit 30 and causes the display unit 30 to display the first data d1.

The detector 21, the association unit 22, and the calculator 23 repeat similar processing for the multiple object images included in the second picture 62 and calculate the relative second positional relationship 52 between the third image 83 and the fourth image 84 included in the second picture 62.

The display controller 24 compares the first positional relationship 51 to the second positional relationship 52 and determines whether or not the state of the change of the relative positional relationship is the first state. If the state is the first state, the first associated information 41 is displayed superimposed onto the second picture 62. At this time, the display position may be determined by determining the position to display the associated information by using the position of the object image as a starting point. On the other hand, if the state is a second state which is different from the first state, the first associated information 41 is not displayed in the second picture 62. Or, other associated information that is different from the first associated information 41 may be displayed in the second picture 62. For example, second associated information that relates to the second object 72 may be displayed as the other associated information. Here, the second state is a state in which the second positional relationship 52 has changed with respect to the first positional relationship 51.

Thus, based on the relative positional relationships of the multiple object images included in the picture, a control can be performed to continuously display the same associated information or switch to the display of other associated information. Therefore, even in the case where multiple pictures are input continuously, the associated information is not switched frequently; and associated information that is easily-viewable by the user can be displayed.

Figure 3A:
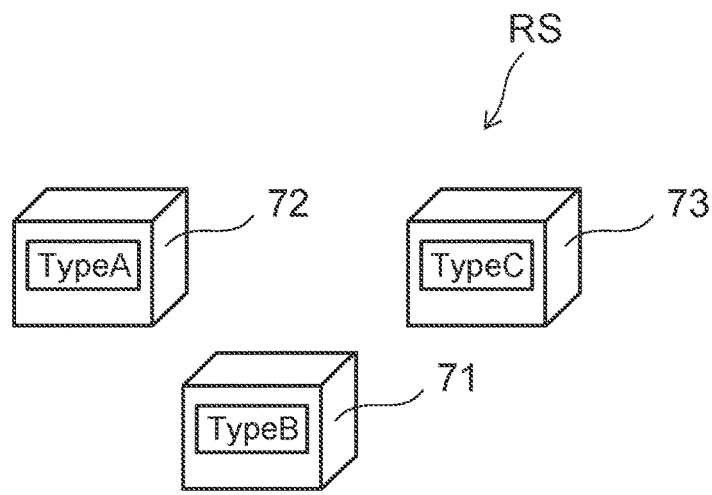
FIG. 3A and FIG. 3B are schematic views showing an application example of the information processing device according to the first embodiment.
Figure 3B:
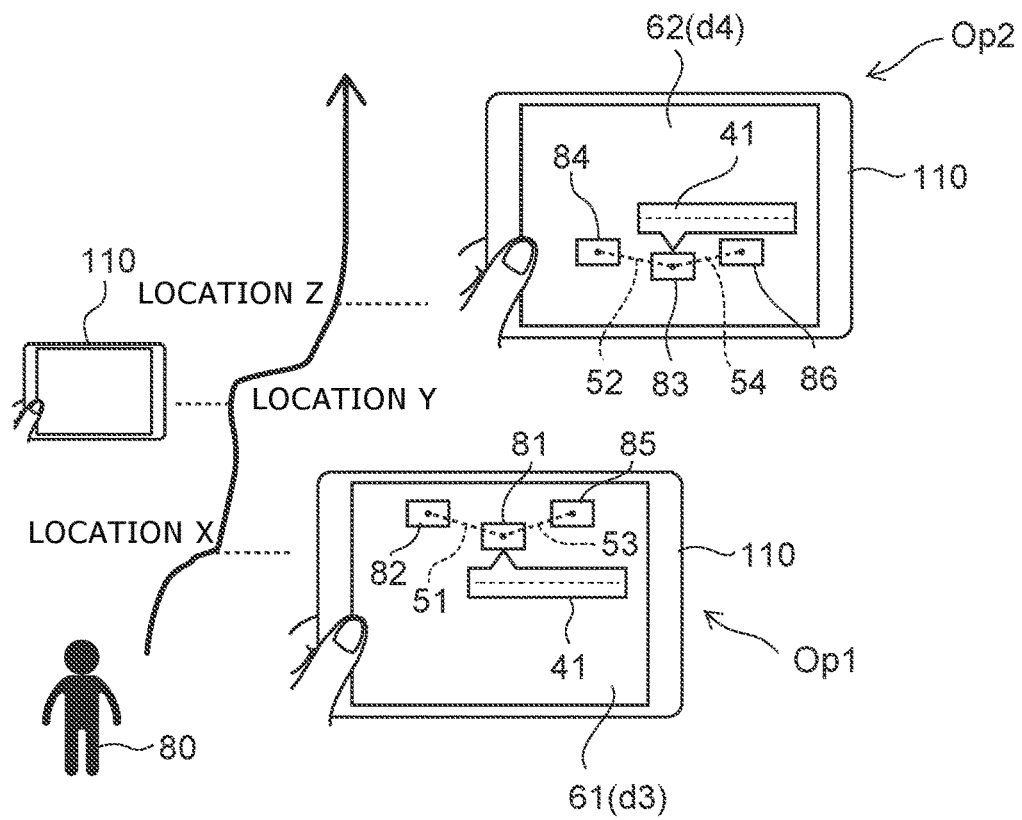

FIG. 3A and FIG. 3B are schematic views showing an application example of the information processing device according to the first embodiment.

FIG. 3A is a schematic view showing multiple objects.

FIG. 3B is a schematic view showing the state in which an operator 80 holds the information processing device 110 and moves from a location X to a location Z while imaging multiple objects.

As shown in FIG. 3A, the first object 71, the second object 72, and a third object 73 exist in the real space RS. As shown in FIG. 3B, the information processing device 110 is, for example, a tablet terminal including a camera (the imaging unit 60). For example, the first associated information 41 that relates to the first object 71 is displayed in the information processing device 110; and the operator 80 approaches the first to third objects 71 to 73 while viewing the first associated information 41. The operator 80 moves in the order of the location X, the location Y, and the location Z. The operator 80 moves while holding the information processing device 110 up to the first to third objects 71 to 73. The first picture 61 (the location X) further includes a fifth image 85 of the third object 73 in addition to the first image 81 and the second image 82. The second picture 62 (the location Z) includes a sixth image 86 of the third object 73 in addition to the third image 83 and the fourth image 84.

In the example, the first operation Op1 generates third data d3 that displays the first associated information 41 associated with the first image 81 superimposed onto the first picture 61. The second operation Op2 generates fourth data d4 that displays the first associated information 41 superimposed onto the second picture 62 when the state of the change between the first positional relationship 51 and the second positional relationship 52 is the first state and when the state of the change between a relative third positional relationship 53 of the fifth image 85 having the first image 81 as the reference and a relative fourth positional relationship 54 of the sixth image 86 having the third image 83 as the reference is a third state. Similarly to the first state, the third state includes, for example, the state in which there is no change between the third positional relationship 53 and the fourth positional relationship 54 or the change is small. In other words, the third state includes the state in which the third positional relationship 53 and the fourth positional relationship 54 substantially do not change.

FIG. 4A and FIG. 4B show operations of the detector according to the first embodiment.

FIG. 4A is a schematic view showing the first picture 61.

FIG. 4B is a flowchart describing an operational example of the detector 21.

As shown in FIG. 4A, the information processing device 110 images the first object 71, the second object 72, and the third object 73 at the location X, acquires the first picture 61 including the first image 81, the second image 82, and the fifth image 85, and displays the first picture 61 on a screen. Here, the first object 71 is identified with the character label "Type B;" the second object 72 is identified with the character label "Type A;" and the third object 73 is identified with the character label "Type C." In the example, character recognition of the character labels of the first picture 61 is performed; based on the character recognition, the positions of the object images (the first image 81, the second image 82, and the fifth image 85) are calculated; and the types of the object images are recognized.

As shown in FIG. 4B, the detector 21 detects the multiple object images (the first image 81, the second image 82, and the fifth image 85) from the first picture 61 (step S1). For example, character recognition of the first picture 61 is performed; and the images that include characters are detected as the object images. Technology that detects characters in pictures includes various methods called scene text detection. For example, the picture is subdivided into multiple small regions; and features including multidimensional vectors are extracted for each subdivided small region. For example, local features such as SIFT (Scale-Invariant Feature Transform), etc., may be utilized as the features. For example, the local features may be associated with a pattern in a database in which patterns of typical character images (upper-case or lower-case alphanumeric characters) are registered, and it can be determined that the object image exists in small regions where there is a constant number of correspondence. Thereby, the first image 81 that includes "Type B," the second image 82 that includes "Type A," and the fifth image 85 that includes "Type C" are detected from the first picture 61.

Then, the detector 21 calculates the positions of the object images (the first image 81, the second image 82, and the fifth image 85) (step S2). Here, the positions of the object images are calculated based on multiple character groups. For example, a group of adjacent characters are detected as a character string; and the centroid of a circumscribing rectangle containing the detected character string is calculated as the position of the object image.

Then, the detector 21 recognizes the type of the object images (the first image 81, the second image 82, and the fifth image 85) (step S3). The types of the object images, i.e., "Type B" of the first image 81, "Type A" of the second image 82, and "Type C" of the fifth image 85, are recognized using the character patterns associated with the local features.

FIG. 5A and FIG. 5B show operations of the association unit according to the first embodiment.

FIG. 5A shows the associated information 40a.

FIG. 5B is a flowchart describing an operational example of the association unit 22.

As shown in FIG. 5A, a database is maintained in which the types ("Type B," "Type A," and "Type C") of the object images (the first image 81, the second image 82, and the fifth image 85) and the associated information 40a (the first associated information 41, second associated information 42, and third associated information 43) are associated. The database is pre-stored in the first memory 40. In the example, "This is the initial device to be checked" (the first associated information 41) that relates to the first object 71 corresponds to "Type B" of the first image 81. "Please confirm if meter is in normal range" (the second associated information 42) that relates to the second object 72 corresponds to "Type A" of the second image 82. "Please confirm if switch is ON" (the third associated information 43) that relates to the third object 73 corresponds to "Type C" of the fifth image 85.

As shown in FIG. 5B, based on the types of the object images, the association unit 22 searches the database (the first memory 40) (step S11) and associates the associated information with the object images (step S12). For example, the second image 82 detected from the first picture 61 is identified with the type of "Type A". Therefore, the second associated information 42, i.e., "Please confirm if meter is in normal range," is associated. Similarly, the first image 81 is identified with the type of "Type B". Therefore, the first associated information 41, i.e., "This is the initial device to be checked," is associated. The fifth image 85 is identified with the type of "Type C". Therefore, the third associated information 43, i.e., "Please confirm if switch is ON," is associated.

Here, the first image 81 is preset as the object image of interest for which the associated information is to be displayed. Therefore, the first associated information 41 associated with the first image 81 is displayed superimposed onto the first picture 61.

As shown in FIG. 3B, similar processing is implemented for the second picture 62 at the location Z as well. In other words, the detector 21 detects the multiple object images (the third image 83, the fourth image 84, and the sixth image 86) from the second picture 62. The detector 21 calculates the positions of the object images and recognizes the types of the object images. Based on the types of the object images, the association unit 22 searches the database (the first memory 40) and associates the associated information with the object images. For example, the fourth image 84 detected from the second picture 62 is identified with the type of "Type A". Therefore, the second associated information 42, i.e., "Please confirm if meter is in normal range," is associated. Similarly, the third image 83 is identified with the type of "Type B". Therefore, the first associated information 41, i.e., "This is the initial device to be checked," is associated. The sixth image 86 is identified with the type of "Type C". Therefore, the third associated information 43, i.e., "Please confirm if switch is ON," is associated.

FIG. 6A to FIG. 6D show operations of the calculator according to the first embodiment.

FIG. 6A is a flowchart describing an operational example of the calculator 23.

FIG. 6B is a schematic view showing a first relative coordinate system.

FIG. 6C is a schematic view showing a second relative coordinate system.

FIG. 6D shows the calculation result of the first to fourth positional relationships.

As shown in FIG. 6A, the calculator 23 acquires the coordinates of the multiple object images (the first image 81, the second image 82, and the fifth image 85) included in the first picture 61 at the location X (step S21). Then, the calculator 23 determines the center point of the relative coordinate system to calculate the relative positional relationships of the multiple object images (step S22). For example, as shown in FIG. 6B, a first relative coordinate system c1 is set in which a first position b1 inside the first image 81 including the character string "Type B" most proximal to the center of the angle of view at the location X is used as the center point. Then, as shown in FIG. 6D, based on the first relative coordinate system c1, the calculator 23 calculates the first positional relationship 51 and the third positional relationship 53 (step S23).

Here, the first relative coordinate system c1 includes a first axis a1 and a second axis a2. The first axis a1 passes through the first position b1 and extends in a first direction D1. The second axis a2 passes through the first position b1 and extends in a second direction D2 intersecting the first direction D1. The first direction D1 is, for example, the X-axis direction of the first picture 61. The second direction D2 is, for example, the Y-axis direction of the first picture 61.

The first positional relationship 51 includes a first orientation hd1 and a second orientation hd2. The first orientation hd1 is the orientation along the first axis a1 of a third direction D3. The third direction D3 is the direction from the first image 81 toward the second image 82. The second orientation hd2 is the orientation along the second axis a2 of the third direction D3. In other words, if the second image 82 is on the right side of the second axis a2, the first orientation hd1 is rightward. The state in which the first orientation hd1 is rightward is expressed as "+." If the second image 82 is on the left side of the second axis a2, the first orientation hd1 is leftward. The state in which the first orientation hd1 is leftward is expressed as "−." If the second image 82 is on the upper side of the first axis a1, the second orientation hd2 is upward. The state in which the second orientation hd2 is upward is expressed as "+." If the second image 82 is on the lower side of the first axis a1, the second orientation hd2 is downward. The state in which the second orientation hd2 is downward is expressed as "−." In the case of the example of FIG. 6B, the positional relationship between the first image 81 (Type B) and the second image 82 (Type A) is (left side, upper side); therefore, (first orientation hd1, second orientation hd2) is expressed as (−, +).

The third positional relationship 53 includes a fifth orientation hd5 and a sixth orientation hd6. The fifth orientation hd5 is the orientation along the first axis a1 of a fifth direction D5. The fifth direction D5 is the direction from the first image 81 toward the fifth image 85. The sixth orientation hd6 is the orientation along the second axis a2 of the fifth direction D5. In other words, if the fifth image 85 is on the right side of the second axis a2, the fifth orientation hd5 is rightward. The state in which the fifth orientation hd5 is rightward is expressed as "+." If the fifth image 85 is on the left side of the second axis a2, the fifth orientation hd5 is leftward. The state in which the fifth orientation hd5 is leftward is expressed as "−." If the fifth image 85 is on the upper side of the first axis a1, the sixth orientation hd6 is upward. The state in which the sixth orientation hd6 is upward is expressed as "+." If the fifth image 85 is on the lower side of the first axis a1, the sixth orientation hd6 is downward. The state in which the sixth orientation hd6 is downward is expressed as "−." In the case of the example of FIG. 6B, the positional relationship between the first image 81 (Type B) and the fifth image 85 (Type C) is (right side, upper side); therefore, (fifth orientation hd5, sixth orientation hd6) is expressed as (+, +).

The calculator 23 implements similar processing for the second picture 62 at the location Z. That is, the calculator 23 acquires the coordinates of the multiple object images (the third image 83, the fourth image 84, and the sixth image 86) included in the second picture 62 (step S21). Then, the calculator 23 determines the center point of the relative coordinate system to calculate the relative positional relationships of the multiple object images (step S22). For example, as shown in FIG. 6C, a second relative coordinate system c2 is set in which a second position b2 of the third image 83 including the character string "Type B" most proximal to the center of the angle of view at the location Z is used as the center point. Then, as shown in FIG. 6D, based on the second relative coordinate system c2, the calculator 23 calculates the second positional relationship 52 and the fourth positional relationship 54 (step S23).

Here, the second relative coordinate system c2 includes a third axis a3 and a fourth axis a4. The third axis a3 passes through the second position b2 and extends in the first direction D1. The fourth axis a4 passes through the second position b2 and extends in the second direction D2 intersecting the first direction D2. The first direction D1 is, for example, the X-axis direction of the second picture 62. The second direction D2 is, for example, the Y-axis direction of the second picture 62.

The second positional relationship 52 includes a third orientation hd3 and a fourth orientation hd4. The third orientation hd3 is the orientation along the third axis a3 of a fourth direction D4. The fourth direction D4 is the direction from the third image 83 toward the fourth image 84. The fourth orientation hd4 is the orientation along the fourth axis a4 of the fourth direction D4. In other words, if the fourth image 84 is on the right side of the fourth axis a4, the third orientation hd3 is rightward. The state in which the third orientation hd3 is rightward is expressed as "+." If the fourth image 84 is on the left side of the fourth axis a4, the third orientation hd3 is leftward. The state in which the third orientation hd3 is leftward is expressed as "−." If the fourth image 84 is on the upper side of the third axis a3, the fourth orientation hd4 is upward. The state in which the fourth orientation hd4 is upward is expressed as "+." If the fourth image 84 is on the lower side of the third axis a3, the fourth orientation hd4 is downward. The state in which the fourth orientation hd4 is downward is expressed as "−." In the case of the example of FIG. 6C, the positional relationship between the third image 83 (Type B) and the fourth image 84 (Type A) is (left side, upper side); therefore, (third orientation hd3, fourth orientation hd4) is expressed as (−, +).

The fourth positional relationship 54 includes a seventh orientation hd7 and an eighth orientation hd8. The seventh orientation hd7 is the orientation along the third axis a3 of a sixth direction D6. The sixth direction D6 is the direction from the third image 83 toward the sixth image 86. The eighth orientation hd8 is the orientation along the fourth axis a4 of the sixth direction D6. In other words, if the sixth image 86 is on the right side of the fourth axis a4, the seventh orientation hd7 is rightward. The state in which the seventh orientation hd7 is rightward is expressed as "+." If the sixth image 86 is on the left side of the fourth axis a4, the seventh orientation hd7 is leftward. The state in which the seventh orientation hd7 is leftward is expressed as "−." If the sixth image 86 is on the upper side of the third axis a3, the eighth orientation hd8 is upward. The state in which the eighth orientation hd8 is upward is expressed as "+." If the sixth image 86 is on the lower side of the third axis a3, the eighth orientation hd8 is downward. The state in which the eighth orientation hd8 is downward is expressed as "−." In the case of the example of FIG. 6C, the positional relationship between the third image 83 (Type B) and the sixth image 86 (Type C) is (right side, upper side); therefore, (seventh orientation hd7, eighth orientation hd8) is expressed as (+, +).

Figures 7A, 7B:
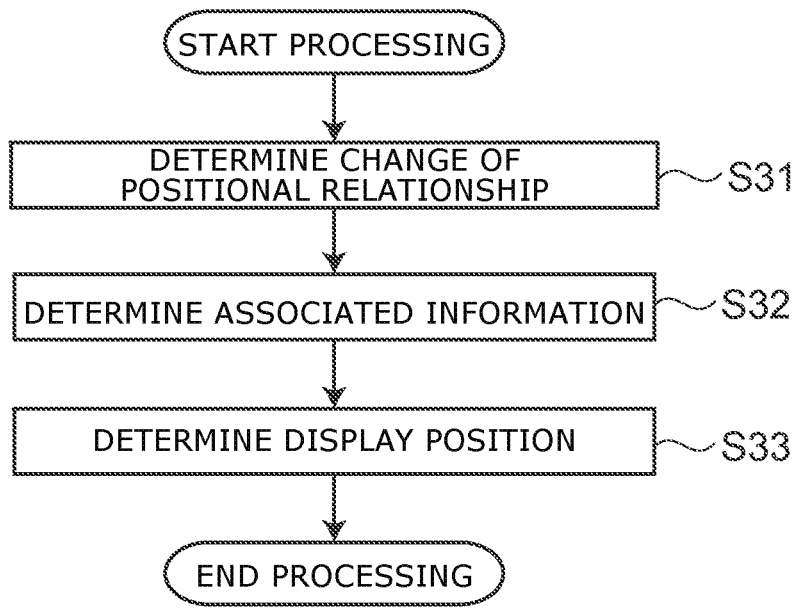
FIG. 7A and FIG. 7B show operations of the display controller according to the first embodiment.

FIG. 7A and FIG. 7B show operations of the display controller according to the first embodiment.

FIG. 7A is a flowchart describing an operational example of the display controller 24.

FIG. 7B shows the determination result of the object image of interest.

As shown in FIG. 7A and FIG. 7B, the display controller 24 determines whether or not there is a substantial change between the first positional relationship 51 and the second positional relationship 52 and between the third positional relationship 53 and the fourth positional relationship 54 (step S31); the associated information to be displayed is determined based on the determination result (step S32); and the display position of the associated information is determined (step S33).

In the example, the first orientation hd1 is the same as the third orientation hd3; and the second orientation hd2 is the same as the fourth orientation hd4. Therefore, the state of the change between the first positional relationship 51 and the second positional relationship 52 is determined to be the first state. Also, the fifth orientation hd5 is the same as the seventh orientation hd7; and the sixth orientation hd6 is the same as the eighth orientation hd8. Therefore, the state of the change between the third positional relationship 53 and the fourth positional relationship 54 is determined to be the third state. In this case, the display controller 24 determines that there is substantially no change of the positional relationship at the location Z; and the display of the associated information that was displayed at the location X is continued. On the other hand, when it is determined that the positional relationship at the location Z is changing, the object image of interest is set again; and the associated information to be displayed is switched to other associated information.

It is taken that the "Type B" object image is determined as the object image of interest at the location X and the location Y. When the location Z is reached, it is determined whether or not the relative positional relationships have changed substantially. By comparing the positional relationships at the location X (and the location Y) to the positional relationships at the location Z, it can be seen that these positional relationships have not changed substantially. Therefore, it is determined that the object image of interest is the same "Type B" object image as that of the location X (and the location Y). In this case, the associated information to be displayed can be determined to be the first associated information 41, i.e., "This is the initial device to be checked."

The display position of the associated information may be determined adaptively by the display controller 24. For example, a position that is at the periphery of the object image of interest and does not overlap the other detected object images may be determined as the display position.

Figure 8A:
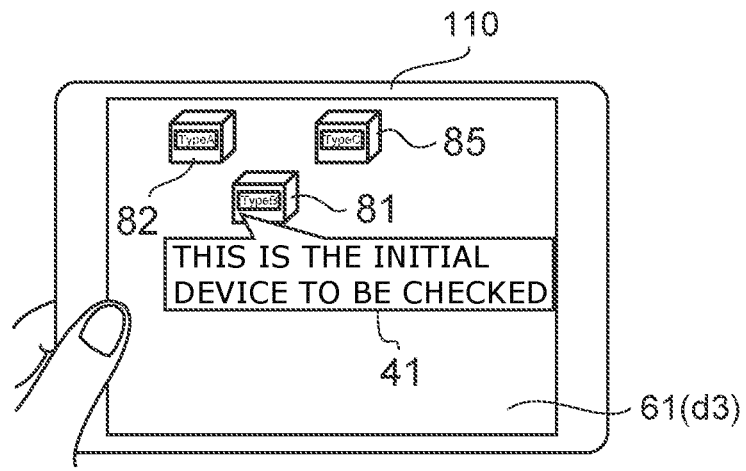
FIG. 8A to FIG. 8C are schematic views showing display results of the associated information according to the first embodiment.
Figure 8B:
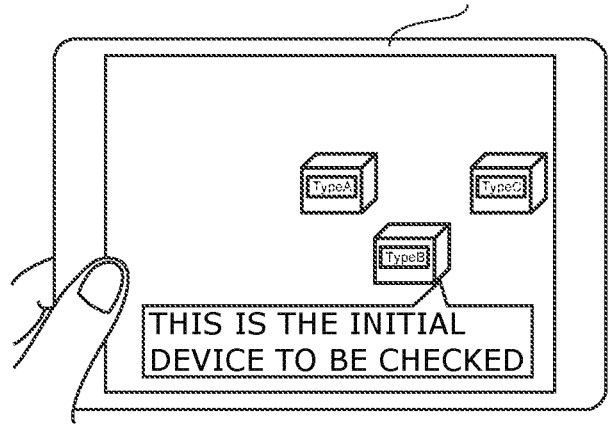
Figure 8C:
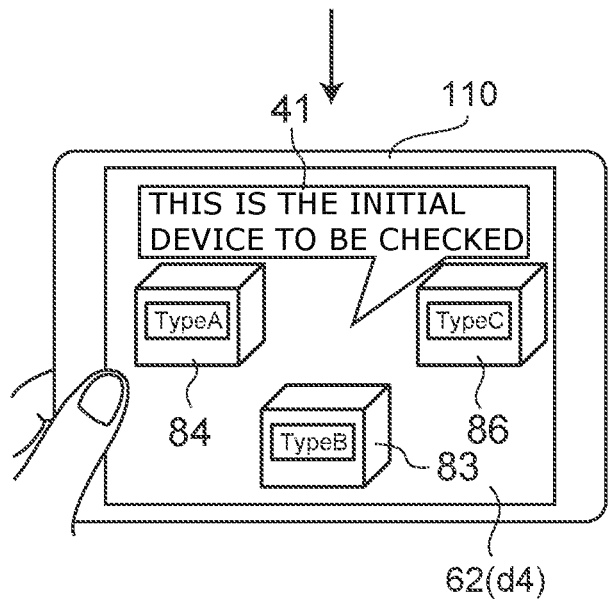

FIG. 8A to FIG. 8C are schematic views showing display results of the associated information according to the first embodiment.

FIG. 8A shows the display result of the associated information at the location X.

FIG. 8B shows the display result of the associated information at the location Y.

FIG. 8C shows the display result of the associated information at the location Z.

As shown in FIG. 3A, the first object 71, the second object 72, and the third object 73 exist in the real space RS. For example, the first associated information 41 that relates to the first object 71 is displayed in the information processing device 110; and the operator 80 approaches the first to third objects 71 to 73 while viewing the first associated information 41. The operator 80 moves in the order of the location X, the location Y, and the location Z. The operator 80 moves while holding the information processing device 110 up to the multiple objects.

As shown in FIG. 8A, the first picture 61 (the location X) further includes the fifth image 85 of the third object 73 in addition to the first image 81 and the second image 82. As shown in FIG. 8C, the second picture 62 (the location Z) further includes the sixth image 86 of the third object 73 in addition to the third image 83 and the fourth image 84. There is substantially no change of the relative positional relationships of the multiple object images at the location X and the location Z. Therefore, the display of the first associated information 41 that was displayed at the location X is continued at the location Z.

In the example recited above, circumstances are assumed in which the objects are detected accurately in the first picture of the location X, the second picture of the location Y, and the third picture of the location Z. However, even in the case where an object cannot be detected for an instant in one picture of continuous pictures, it is sufficient to determine whether or not the relative positional relationships have changed by supplementing the undetected object using the pictures before and after. For example, when multiple buildings inside a landscape as viewed by the user are imaged, the building that is the object may be hidden for an instant by an obstacle, the picture may be blurred, etc., because the user that holds the imaging device moves. Such a case may be accommodated by supplementing the detection objects of the pictures before and after; or the processing may be performed at a prescribed frame interval without processing all of the imaging images. For example, this is similar in the case where objects move such as when a car, a package, etc., moves along a prescribed course. Such processing may be added by an instruction of the user by separately preparing a unit for switching according to prescribed circumstances.

Thus, according to the embodiment, even when the positions of the multiple object images included in the picture change due to the movement of the operator, if the relative positional relationships of the multiple object images do not change, the display of the same associated information can be continued. Therefore, the display of the associated information can be easy to view.

Second Embodiment

Figure 9:
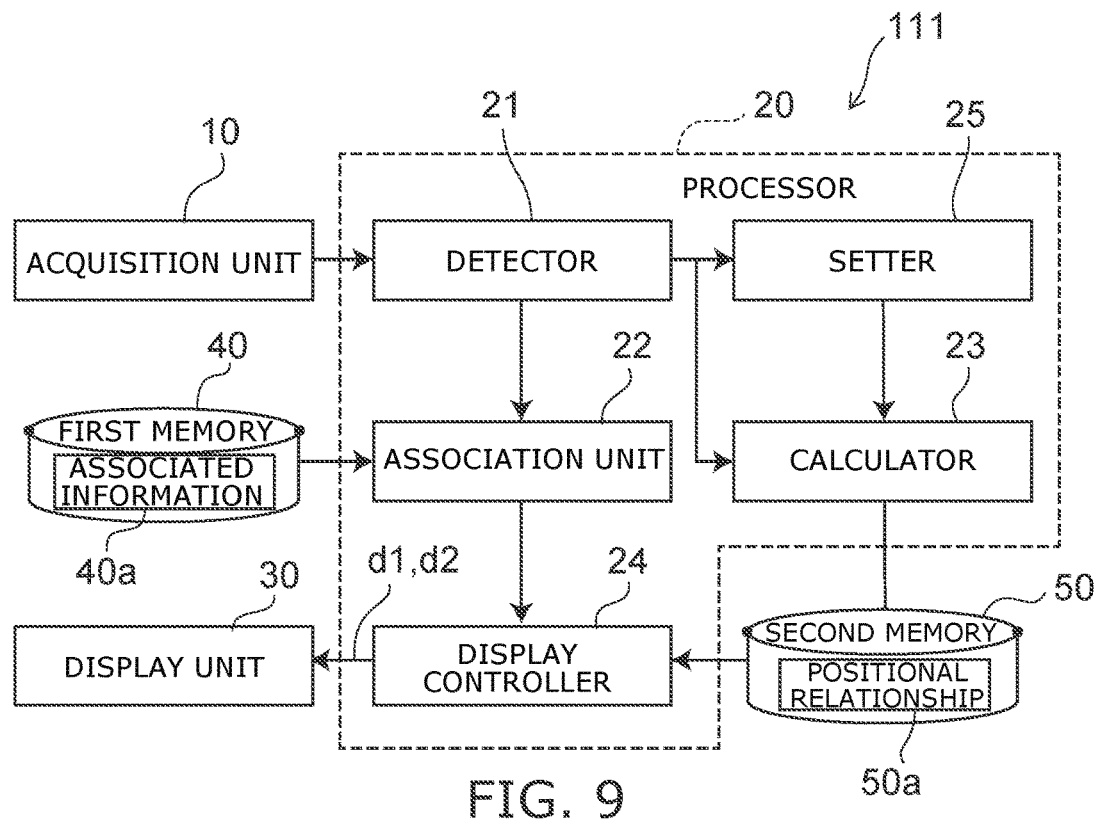
FIG. 9 is a block diagram showing an information processing device according to a second embodiment.

FIG. 9 is a block diagram showing an information processing device according to a second embodiment.

As shown in FIG. 9, a setter 25 is further provided in the information processing device 111 according to the embodiment.

The processor 20 further implements an operation of deriving the first positional relationship 51. The operation of the deriving includes deriving the first positional relationship 51 when the state has continued for a prescribed amount of time in which the distance between the center of the first image 81 and the center of the first picture 61 is shorter than the distance between the center of the second image 82 and the center of the first picture 61. The first positional relationship 51 is the relative positional relationship of the second image 82 having the first image 81 as the reference. The setter 25 sets the first image 81 as the reference. That is, the first image 81 is set to be the object image of interest.

Figure 10A:
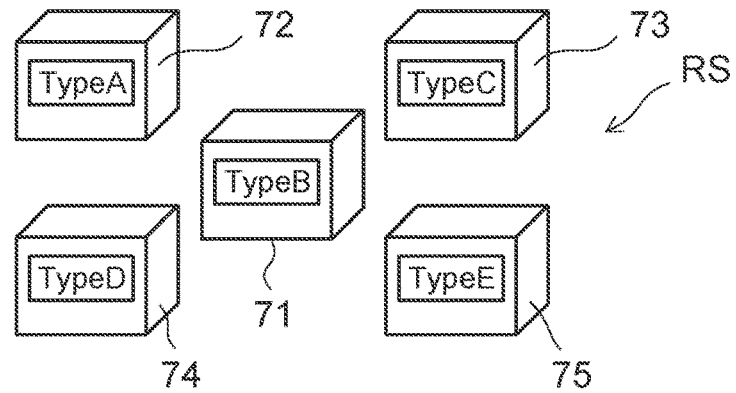
FIG. 10A and FIG. 10B are schematic views showing an application example of the information processing device according to the second embodiment.
Figure 10B:
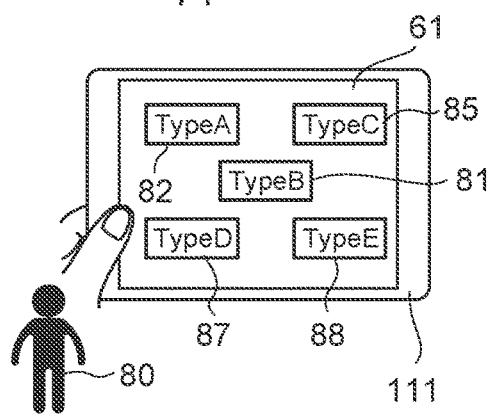

FIG. 10A and FIG. 10B are schematic views showing an application example of the information processing device according to the second embodiment.

FIG. 10A is a schematic view showing multiple objects.

FIG. 10B is a schematic view showing the state in which the operator 80 holds the information processing device 111 and images the multiple objects.

As the multiple objects in the real space RS as shown in FIG. 10A, the first object 71 that includes the character string "Type B," the second object 72 that includes the character string "Type A," the third object 73 that includes the character string "Type C," a fourth object 74 that includes the character string "Type D," and a fifth object 75 that includes the character string "Type E" are provided.

As shown in FIG. 10B, the information processing device 111 displays the first picture 61 in which the first to fifth objects 71 to 75 are imaged. The first picture 61 includes the first image 81 of the first object 71, the second image 82 of the second object 72, the fifth image 85 of the third object 73, a seventh image 87 of the fourth object 74, and an eighth image 88 of the fifth object 75.

The information processing device 111 is, for example, a tablet terminal including a camera (the imaging unit 60). Thus, circumstances are assumed in which the multiple objects exist in the real space RS; and the operator 80 holds the information processing device 111 up to the multiple objects. In the embodiment, the setter 25 that sets the object image of interest is added. An operational example of the setter 25 is described below.

Figure 11A:
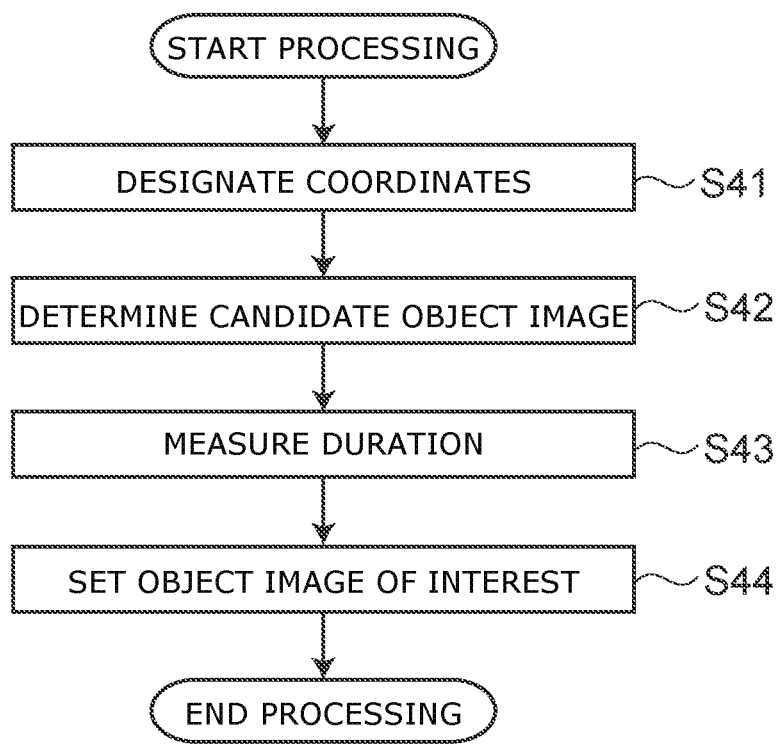
FIG. 11A and FIG. 11B show operations of the setter according to the second embodiment.
Figure 11B:
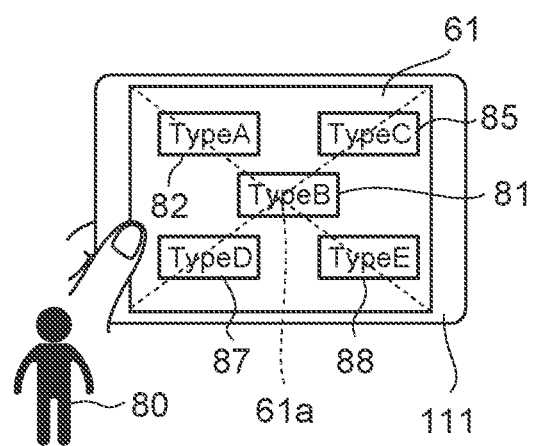

FIG. 11A and FIG. 11B show operations of the setter according to the second embodiment.

FIG. 11A is a flowchart describing an operational example of the setter 25.

FIG. 11B is a schematic view showing an operation of the setter 25.

As shown in FIG. 11A, the setter 25 designates coordinates for estimating the position of the object image of interest in the first picture 61 (step S41). For example, the input may be performed by mounting a touch panel or the like for the coordinate input to the display unit 30. Or, a designated region existing in the angle of view may be designated as the coordinates. Here, as shown in FIG. 11B, a center coordinate 61*a* of the angle of view is designated. Among the five images 81, 82, 85, 87, and 88 corresponding to the first to fifth objects 71 to 75, the "Type B" first image 81 is most proximal to the center coordinate 61*a*. Therefore, the "Type B" first image 81 is determined as the candidate object image (step S42).

The setter 25 measures the duration (step S43). For example, in the case where the threshold is set to 2 seconds, the first image 81 is set to be the object image of interest by fixing the angle of view of the information processing device 111 for 2 seconds or more (step S44).

In other words, the distance between the center of the first image 81 and the center coordinate 61*a* of the first picture 61 is shorter than the distance between the center of the second image 82 and the center coordinate 61*a* of the first picture 61. When this positional relationship is continued for a prescribed amount of time, the first image 81 is set to be the object image of interest. Thereby, the first positional relationship 51 is derived. The positional relationships between the first image 81, the fifth image 85, the seventh image 87, and the eighth image 88 are similar to the positional relationship between the first image 81 and the second image 82.

After the operator 80 explicitly sets the object image of interest, the display controller 24 performs the control so that the display of the associated information relating to the object image of interest is continued as long as the relative positional relationship does not change.

Figure 12A:
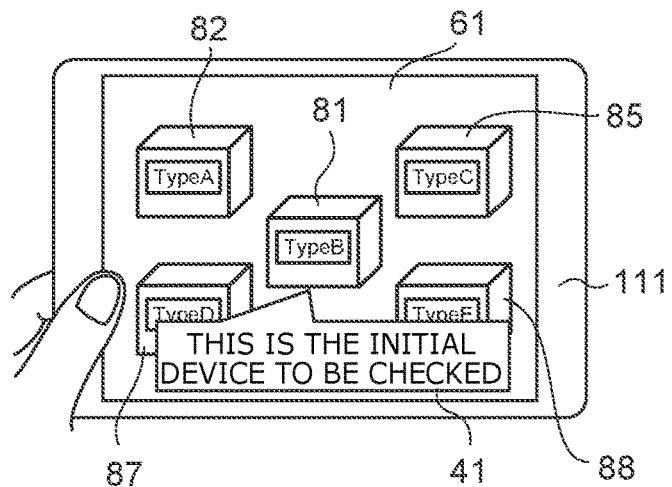
FIG. 12A to FIG. 12C are schematic views showing a display result of the associated information according to the second embodiment.
Figure 12B:
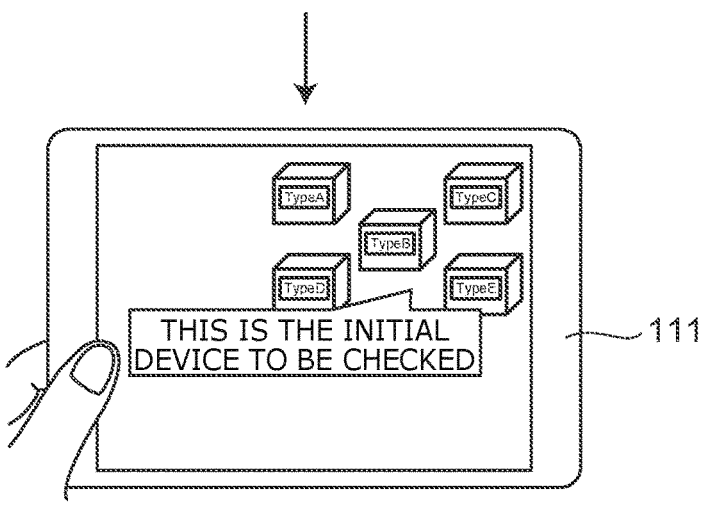
Figure 12C:
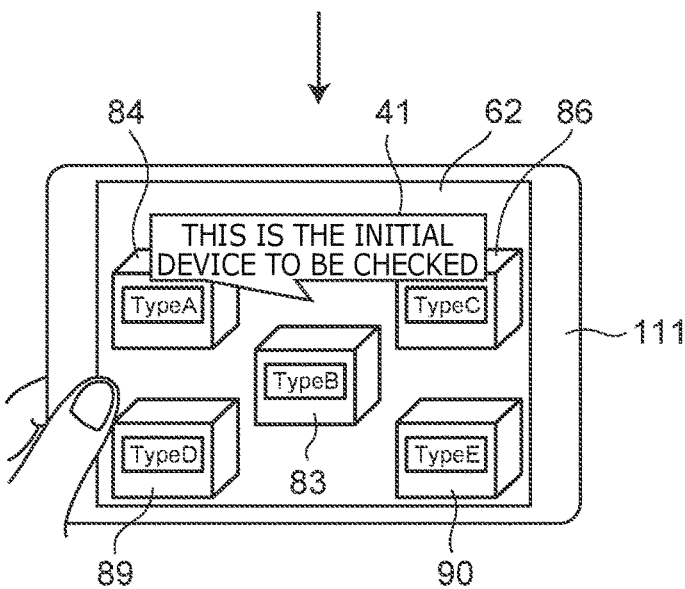

FIG. 12A to FIG. 12C are schematic views showing a display result of the associated information according to the second embodiment.

FIG. 12A shows the display result of the associated information at the location X.

FIG. 12B shows the display result of the associated information at the location Y.

FIG. 12C shows the display result of the associated information at the location Z.

As shown in FIG. 10A, the first to fifth objects 71 to 75 exist in the real space RS. The locations X, Y, and Z of the example are similar to the locations X, Y, and Z shown in FIG. 3B. For example, the first associated information 41 that relates to the first object 71 is displayed in the information processing device 111; and the operator 80 approaches the first to fifth objects 71 to 75 while viewing the first associated information 41. The operator 80 moves in the order of the location X, the location Y, and the location Z. The operator 80 moves while holding the information processing device 111 up to the multiple objects.

As shown in FIG. 12A, the first picture 61 (the location X) further includes the seventh image 87 of the fourth object 74 and the eighth image 88 of the fifth object 75 in addition to the first image 81, the second image 82, and the fifth image 85. As shown in FIG. 12C, the second picture 62 (the location Z) further includes a ninth image 89 of the fourth object 74 and a tenth image 90 of the fifth object 75 in addition to the third image 83, the fourth image 84, and the sixth image 86. There is substantially no change of the relative positional relationships of the multiple object images at the location X and the location Z. Therefore, the display of the first associated information 41 that was displayed at the location X is continued at the location Z.

Thus, according to the embodiment, by providing the setter, the operator can set the desired object image of interest; further, because the display of the associated information relating to the object image of interest that is set can be continued, it is possible to provide the associated information that is easy to view.

Third Embodiment

Figure 13A:
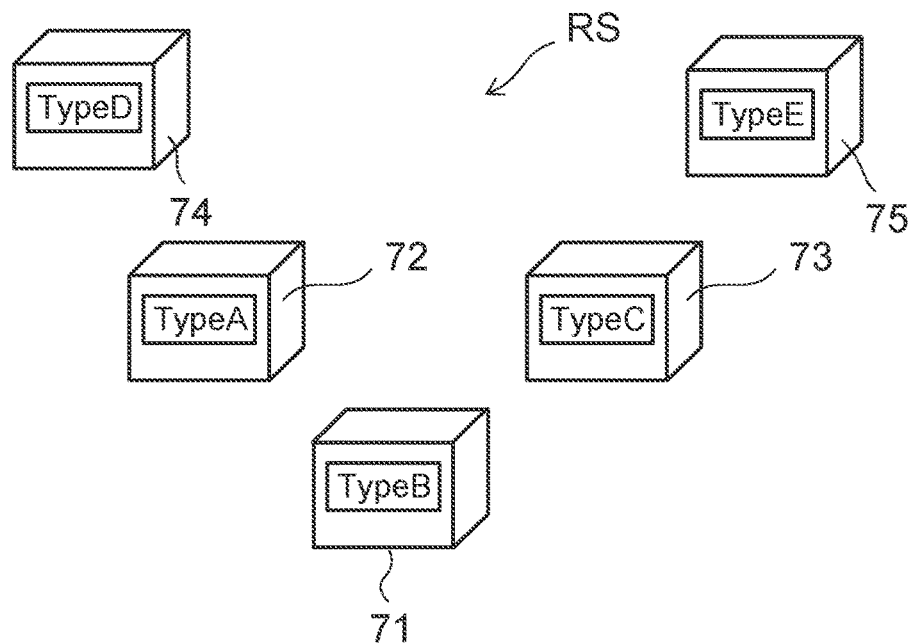
FIG. 13A and FIG. 13B are schematic views showing an application example of an information processing device according to a third embodiment.
Figure 13B:
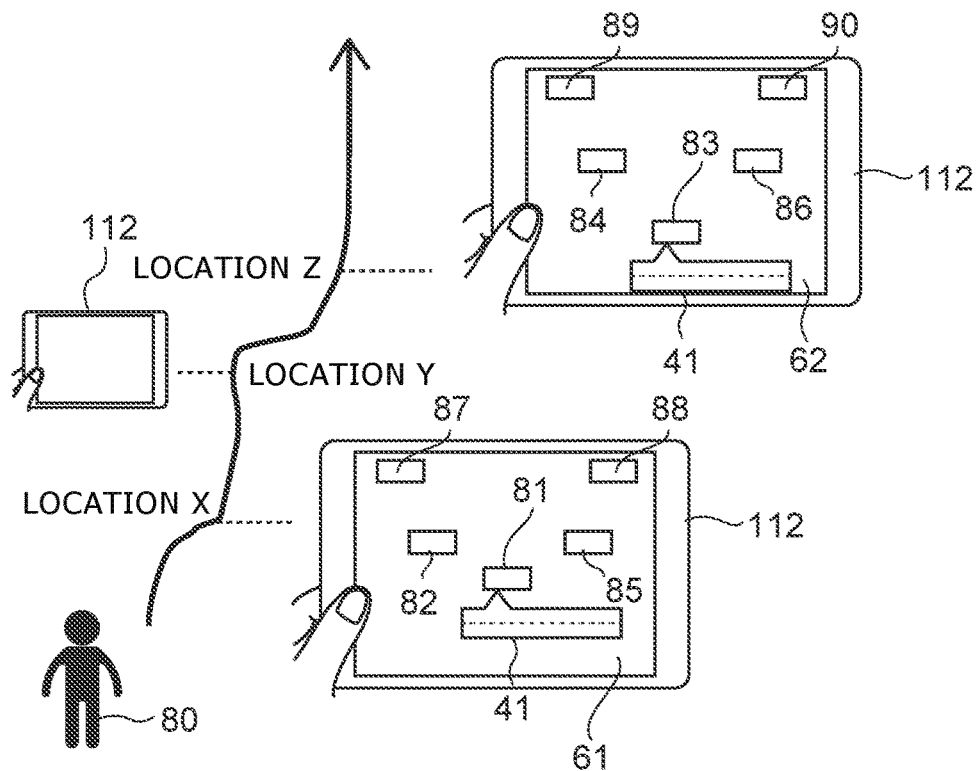

FIG. 13A and FIG. 13B are schematic views showing an application example of an information processing device according to a third embodiment.

FIG. 13A is a schematic view showing multiple objects.

FIG. 13B is a schematic view showing the state in which the operator 80 holds the information processing device 112 and moves from the location X to the location Z while imaging the multiple objects.

As shown in FIG. 13A, the first to fifth objects 71 to 75 exist in the real space RS. As shown in FIG. 13B, the information processing device 112 is, for example, a tablet terminal including a camera (the imaging unit 60). For example, the first associated information 41 that relates to the first object 71 is displayed in the information processing device 112; and the operator 80 approaches the first to fifth objects 71 to 75 while viewing the first associated information 41. The operator 80 moves in the order of the location X, the location Y, and the location Z. The operator 80 moves while holding the information processing device 112 up to the multiple objects. The first picture 61 (the location X) further includes the seventh image 87 of the fourth object 74 and the eighth image 88 of the fifth object 75 in addition to the first image 81, the second image 82, and the fifth image 85. The second picture 62 (the location Z) further includes the ninth image 89 of the fourth object 74 and the tenth image 90 of the fifth object 75 in addition to the third image 83, the fourth image 84, and the sixth image 86.

Figure 14A:
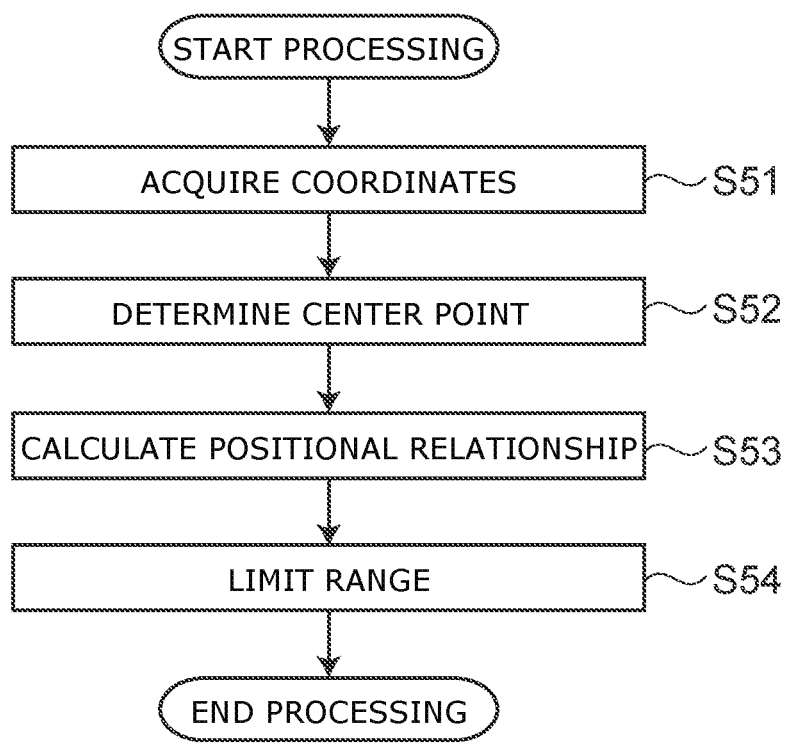
FIG. 14A and FIG. 14B show operations of the calculator according to the third embodiment.
Figure 14B:
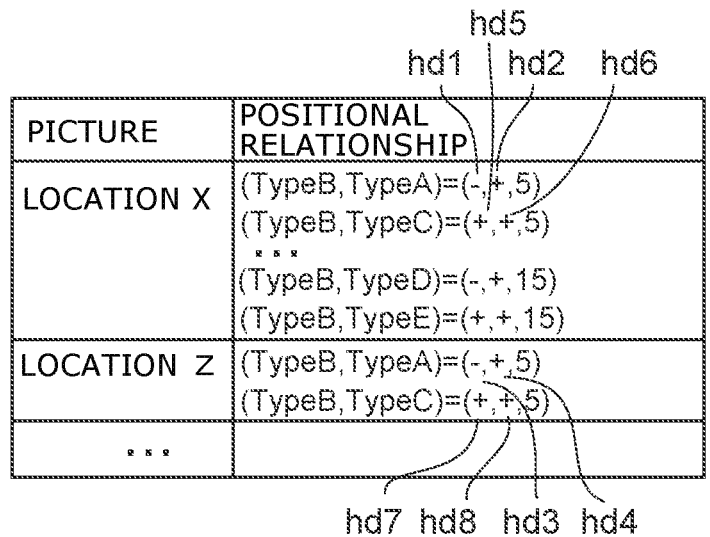

FIG. 14A and FIG. 14B show operations of the calculator according to the third embodiment.

FIG. 14A is a flowchart describing an operational example of the calculator 23.

FIG. 14B shows the calculation result of the positional relationships of the object images.

In the embodiment, the change of the relative positional relationship is determined by selectively extracting the object image proximal to the object image of interest from all of the object images displayed in the first picture 61 and by using only the object image that is extracted.

In other words, the calculator 23 acquires the coordinates of the multiple object images included in the first picture 61 (the location X), i.e., the first image 81, the second image 82, the fifth image 85, the seventh image 87, and the eighth image 88 (step S51). The calculator 23 calculates the relative positional relationships between the multiple object images. Thereby, the center point of the relative coordinate system is determined (step S52). For example, the "Type B" first image 81 that is most proximal to the center of the angle of view at the location X is determined as the object image of interest; and the position of the first image 81 is determined as the center point of the relative coordinate system.

The relative positional relationships are calculated, with the "Type B" first image 81 as the reference, for the "Type A" second image 82, the "Type C" fifth image 85, the "Type D" seventh image 87, and the "Type E" eighth image 88. The method for calculating the positional relationships is as described in reference to FIG. 6A to FIG. 6D described above. A reference distance is set based on the size of the first image 81, etc.; and the distances between the first image 81 and the other images (the second image 82, the fifth image 85, the seventh image 87, and the eighth image 88) are determined.

As shown in FIG. 14B, in the relationship between the "Type B" first image 81 and the "Type A" second image 82, the second image 82 is positioned at (left side, upper side) of the first image 81. The distance between the first image 81 and the second image 82 is, for example, 5 times the reference distance. Therefore, this is expressed as (−, +, 5). Similarly, the relationship between the "Type B" first image 81 and the "Type C" fifth image 85 can be expressed as (+, +, 5). The relationship between the "Type B" first image 81 and the "Type D" seventh image 87 can be expressed as (−, +, 15). The relationship between the "Type B" first image 81 and the "Type E" eighth image 88 can be expressed as (+, +, 15).

Here, the calculator 23 selectively extracts only the object images (here, the second image 82 and the fifth image 85) positioned within a constant range from the position of the first image 81, and uses only the relative positional relationships according to the extracted object images as the objects of the comparison. For example, in the case where the threshold of the distance is set to "10," the relative positional relationship of the "Type D" seventh image 87 and the relative positional relationship of the "Type E" eighth image 88 are not considered as comparison objects. That is, "Type D" and "Type E" are ignored. Accordingly, in the second picture 62 (the location Z), the relative positional relationship of the "Type D" ninth image 89 and the relative positional relationship of the "Type E" tenth image 90 are not calculated and are not considered as comparison objects.

Figures 15A, 15B:
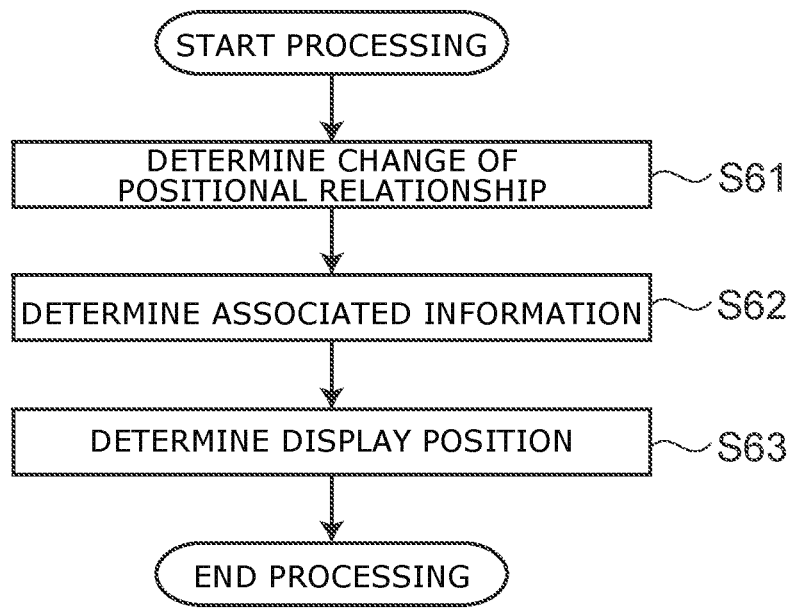
FIG. 15A and FIG. 15B show operations of the display controller according to the third embodiment.

FIG. 15A and FIG. 15B show operations of the display controller according to the third embodiment.

FIG. 15A is a flowchart describing an operational example of the display controller 24.

FIG. 15B shows the determination result of the object image of interest.

As shown in FIG. 15A, the display controller 24 determines whether or not there is a substantial change between the positional relationships at the location X (and the location Y) and the positional relationships at the location Z (step S61), determines the associated information to be displayed based on the determination result (step S62), and determines the display position of the associated information (step S63).

In the example, the first orientation hd1 is the same as the third orientation hd3; and the second orientation hd2 is the same as the fourth orientation hd4. Therefore, the state of the change between the first positional relationship 51 and the second positional relationship 52 is determined to be the first state. The fifth orientation hd5 is the same as the seventh orientation hd7; and the sixth orientation hd6 is the same as the eighth orientation hd8. Therefore, the state of the change between the third positional relationship 53 and the fourth positional relationship 54 is determined to be the third state. In this case, the display controller 24 determines that there is substantially no change of the positional relationships at the location Z and continues the display of the associated information that was displayed at the location X. On the other hand, when it is determined that the positional relationships at the location Z are changing, the object image of interest is set again; and the associated information to be displayed is switched to other associated information.

It is taken that the "Type B" object image is determined as the object image of interest at the location X and the location Y. When the location Z is reached, it is determined whether or not the relative positional relationships have changed substantially. By comparing the positional relationships at the location X (and the location Y) and the positional relationships at the location Z, it can be seen that these positional relationships have not changed substantially. Therefore, it can be determined that the object image of interest is the same "Type B" object image as that of the location X (and the location Y). In such a case, the associated information to be displayed can be determined to be the first associated information 41, i.e., "This is the initial device to be checked."

The display controller 24 may adaptively determine the display position of the associated information. For example, a position that is at the periphery of the object image of interest and does not overlap the other detected object images may be determined as the display position.

Figure 16A:
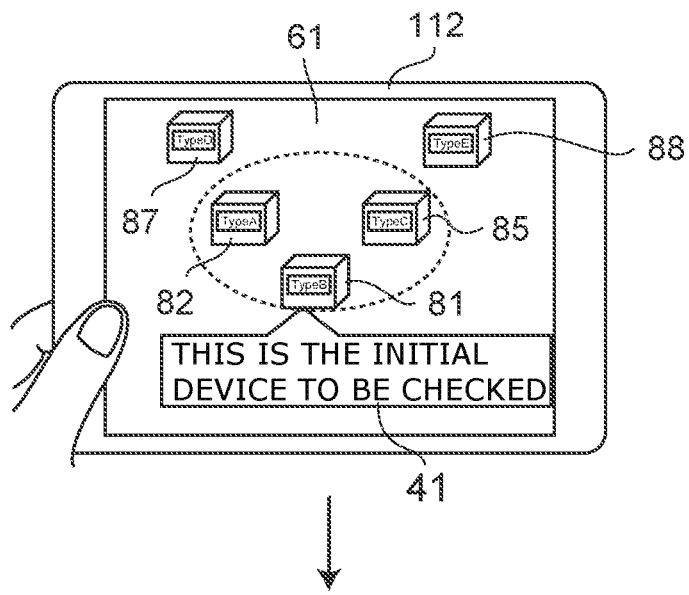
FIG. 16A to FIG. 16C are schematic views showing display results of the associated information according to the third embodiment.
Figure 16B:
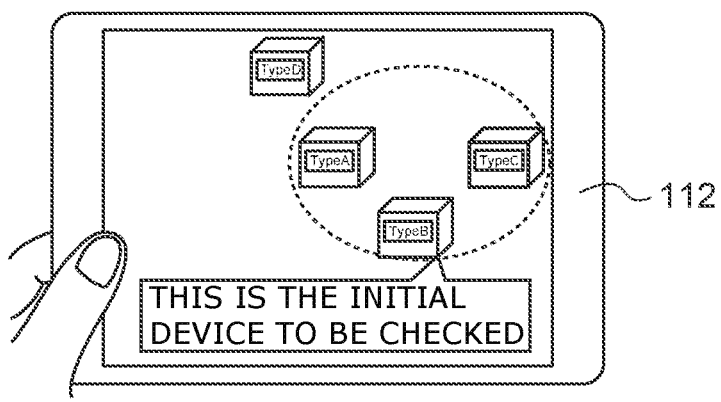
Figure 16C:
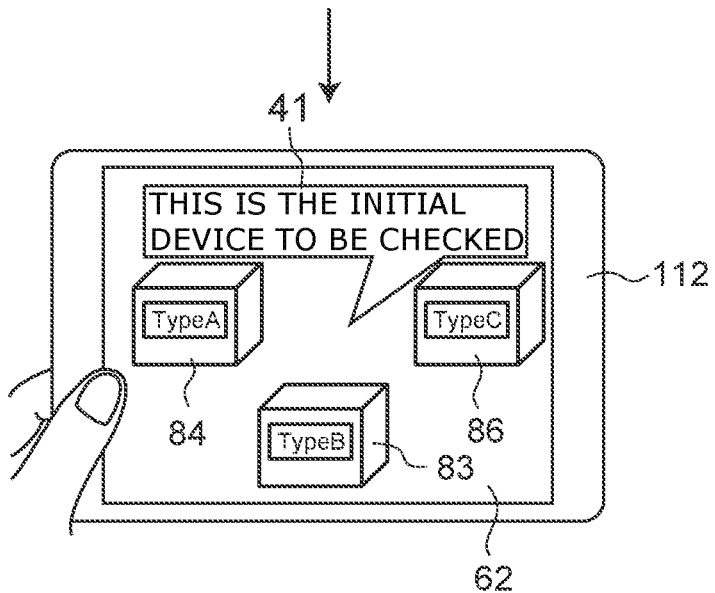

FIG. 16A to FIG. 16C are schematic views showing display results of the associated information according to the third embodiment.

FIG. 16A shows the display result of the associated information at the location X.

FIG. 16B shows the display result of the associated information at the location Y.

FIG. 16C shows the display result of the associated information at the location Z.

As shown in FIG. 13A, the first to fifth objects 71 to 75 exist in the real space RS. The locations X, Y, and Z of the example are similar to the locations X, Y, and Z shown in FIG. 13B. For example, the first associated information 41 that relates to the first object 71 is displayed in the information processing device 112; and the operator 80 approaches the first to fifth objects 71 to 75 while viewing the first associated information 41. The operator 80 moves in the order of the location X, the location Y, and the location Z. The operator 80 moves while holding the information processing device 112 up to the multiple objects.

As shown in FIG. 16A, the first picture 61 (the location X) further includes the seventh image 87 of the fourth object 74 and the eighth image 88 of the fifth object 75 in addition to the first image 81, the second image 82, and the fifth image 85. However, the seventh image 87 and the eighth image 88 are not used as the objects of the comparison of the relative positional relationships. Only the first image 81, the second image 82, and the fifth image 85 surrounded with the dotted line are used as the objects of the comparison of the relative positional relationships. As shown in FIG. 16C, the second picture 62 (the location Z) includes only the third image 83, the fourth image 84, and the sixth image 86. In other words, although the ninth image 89 of the fourth object 74 and the tenth image 90 of the fifth object 75 are not included in the second picture 62, these relative positional relationships of the object images are not considered as comparison objects. Therefore, the display of the first associated information 41 that was displayed at the location X is continued as-is at the location Z.

Thus, according to the embodiment, when many object images are displayed, the comparison can be performed by calculating the relative positional relationships for only the object images proximal to the object image of interest. Therefore, it is possible to rapidly implement the calculation processing.

Fourth Embodiment

Figure 17A:
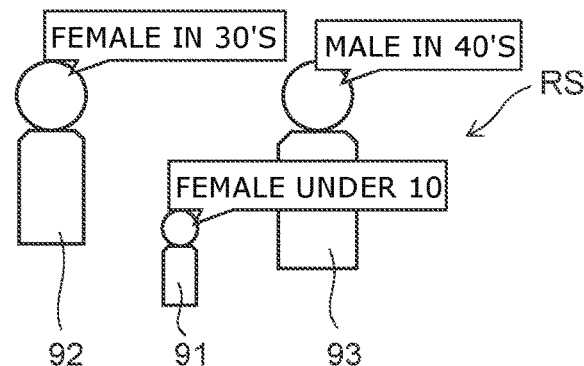
FIG. 17A and FIG. 17B are schematic views showing an application example of an information processing device according to a fourth embodiment.
Figure 17B:
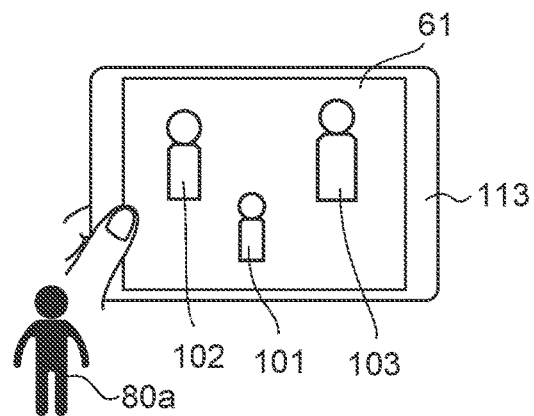

FIG. 17A and FIG. 17B are schematic views showing an application example of an information processing device according to a fourth embodiment.

FIG. 17A is a schematic view showing multiple human objects.

FIG. 17B is a schematic view showing the state in which a guide 80a holds the information processing device 113 and images the multiple human objects.

The information processing device 113 is, for example, a tablet terminal including a camera (the imaging unit 60). In the embodiment, the multiple humans exist inside real space. Conversely, circumstances are assumed in which the guide 80a holds up the information processing device 113 and confirms guide instructions corresponding to the human of interest.

As shown in FIG. 17A, as the multiple human objects, a first human object 91 of "female under 10," a second human object 92 of "female in her 30's," and a third human object 93 of "male in his 40's" exist in the real space RS.

As shown in FIG. 17B, the information processing device 113 displays the first picture 61 in which the first to third human objects 91 to 93 are imaged. The first picture 61 includes a first image 101 of the first human object 91, a second image 102 of the second human object 92, and a third image 103 of the third human object 93.

Figures 18A, 18B:
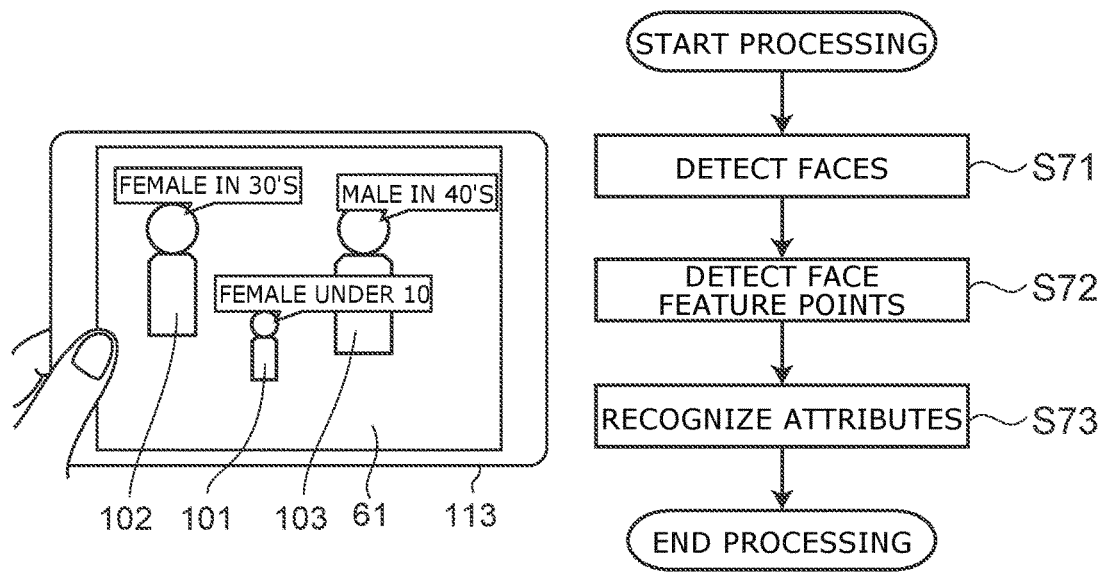
FIG. 18A and FIG. 18B show operations of the detector according to the fourth embodiment.

FIG. 18A and FIG. 18B show operations of the detector according to the fourth embodiment.

FIG. 18A is a schematic view showing the first picture 61.

FIG. 18B is a flowchart describing an operational example of the detector 21.

As shown in FIG. 18A, the images of the human objects each include a face. As shown in FIG. 18B, the detector 21 detects the faces (step S71). Face detection technology includes various methods. For example, the existence or absence of a face is detected by scanning windows of various sizes in the picture. Thereby, faces of different sizes can be processed. The existence or absence of a face is determined in the individual windows by using a co-occurrence pattern of the luminance change that expresses the structural features of the face. Thereby, it is possible to suppress the effects of fluctuations of the illumination conditions, differences of the skin color, etc.

The detector 21 detects the face feature points (step S72). The positions (the feature points) of the structural features of the face such as the eyes, nose, mouth, etc., are extracted from the detected facial regions. By the face feature point detection, the position of the human image used as the object also can be acquired.

The detector 21 recognizes the attributes (step S73). The attribute recognition determines the various attributes of the detected faces. Specific examples may include gender and age. Each detected face is discriminated into male or female and classified into ten-year age groups. As a method for identifying gender and/or age group, a reference face model is associated with the face feature points based on the feature points of the detected faces. After correcting the orientation of the face to be the front, a dictionary is made from face patterns beforehand collected by class; and the class that is proximal to the dictionary is output as the classification result.

FIG. 19A and FIG. 19B show operations of the association unit according to the fourth embodiment.

FIG. 19A shows the associated information 40a.

FIG. 19B is a flowchart describing an operational example of the association unit 22.

As shown in FIG. 19A, a database is maintained in which the associated information 40a is associated with the attribute types of the object human images. The database is pre-stored in the first memory 40.

As shown in FIG. 19B, the association unit 22 searches the database (the first memory 40) based on the attribute types of each of the object human images (step S81) and associates the associated information with each of the object human images (step S82). The association unit 22 may maintain a database in which the associated information is associated with the types of the face attributes detected from the picture. For example, it is taken that the first image 101 of "female under 10" is set as the object human image of interest. Referring to the database based on this setting, fourth associated information 44, i.e., the "Event xxx for children starts in 30 minutes. Please invite," is associated to match the condition of "under 10."

FIG. 20 is a schematic view showing the display result of the associated information according to the fourth embodiment.

As shown in FIG. 20, the fourth associated information 44, i.e., the "Event xxx for children starts in 30 minutes. Please invite," is displayed at the first image 101 of "female under 10" in the information processing device 113.

Thus, even in the case where a face is used as the object, it is possible to present the user (the guide) with the associated information matching the attribute type of the human. Even in such a case, the display of the same associated information can be continued if the relative positional relationship of the object human does not change. Therefore, the display of the associated information can be easy to view.

Fifth Embodiment

Figure 21:
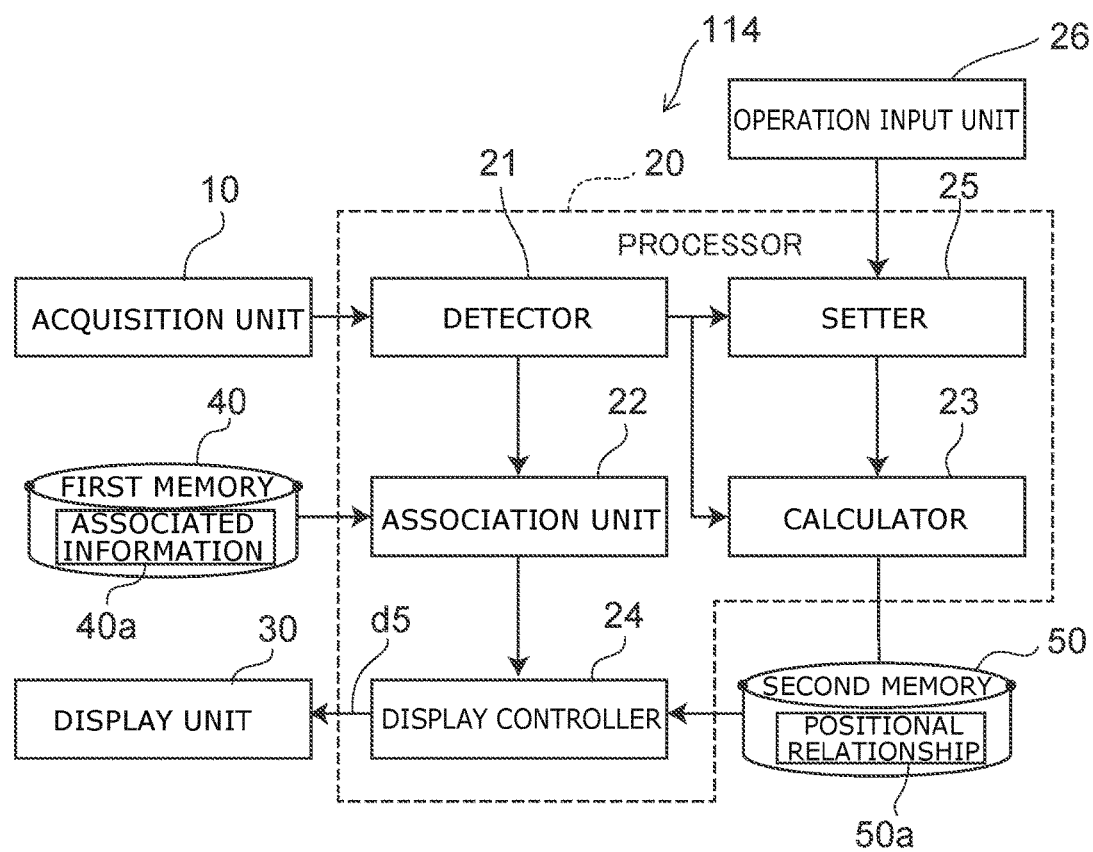
FIG. 21 is a block diagram showing an information processing device according to a fifth embodiment.

FIG. 21 is a block diagram showing an information processing device according to a fifth embodiment.

As shown in FIG. 21, an operation input unit 26 is further provided in the information processing device 114 according to the embodiment.

The processor 20 further implements the operation of modifying the object image of interest used as the reference of the relative positional relationship from the first image 81 to the second image 82. The operation of the modifying includes generating fifth data d5 that displays the second associated information 42 associated with the second image 82 (referring to FIG. 5A) superimposed onto the first picture 61. The processor 20 implements the operation of the modifying based on an operation input received by the operation input unit 26.

FIG. 22A to FIG. 22C show an application example of the information processing device according to the fifth embodiment.

FIG. 22A is a block diagram showing the operation input unit 26.

FIG. 22B is a schematic view showing a screen display example of the operation region.

FIG. 22C shows the relationship between the operation direction and the object image.

The information processing device 114 is, for example, a tablet terminal including a camera (the imaging unit 60). In the embodiment, circumstances are assumed in which multiple objects exist in real space, and the operator 80 holds up the information processing device 114.

As shown in FIG. 22A, the operation input unit 26 includes an operation acquisitor 26a, a relative coordinate calculator 26b, and an object image modifier 26c. The operation input unit 26 modifies the object image of interest based on the positions of the multiple object images input from the detector 21, the object image of interest that is set by the setter 25, and the operation direction input to the operation input unit 26. For example, in the case where the "Type B" first image 81 is set to the object image of interest, modification processing is implemented to modify the object image of interest to the "Type A" second image 82 or the "Type C" fifth image 85.

As shown in FIG. 22B, the operation acquisitor 26a acquires the operation direction by detecting a drag direction by the operator 80 in an operation region 26d provided on the display screen of the information processing device 114. Here, it is taken that an upper-right operation is performed.

The relative coordinate calculator 26b determines what object images exist in which directions based on the relative coordinates (the first positional relationship 51 and the third positional relationship 53) having the object image of interest (the first image 81) determined by the calculator 23 as a starting point. In the example, the operation directions are subdivided by the X-axis and the Y-axis; and the object images existing at positions in each of four quadrants, i.e., (−, −), (−, +), (+, +), and (+, −) are designated. The calculation result is shown in FIG. 22C.

The object image modifier 26c modifies the object image of interest by associating the object image designated by the relative coordinate calculator 26b with the operation direction acquired by the operation acquisitor 26a. Here, the object image of interest is modified to the "Type C" fifth image 85 positioned at the upper right (the relative coordinate (+, +)) of the first image 81. Or, the object image of interest is modified to the "Type A" second image 82 positioned at the upper left (the relative coordinate (−, +)) of the first image 81.

Figure 23A:
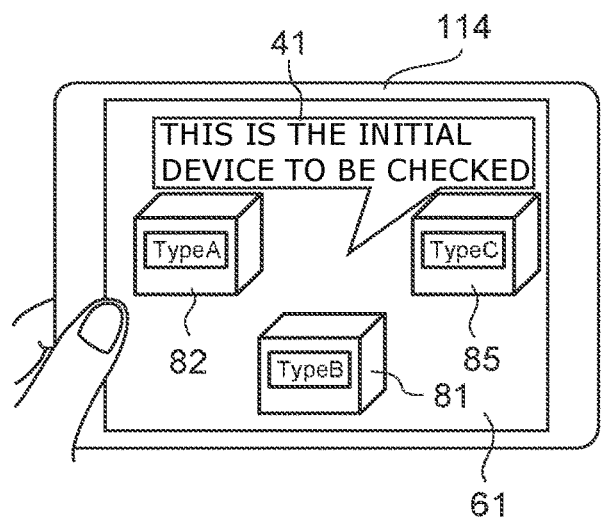
FIG. 23A to FIG. 23C are schematic views showing display results of the associated information according to the fifth embodiment.
Figure 23B:
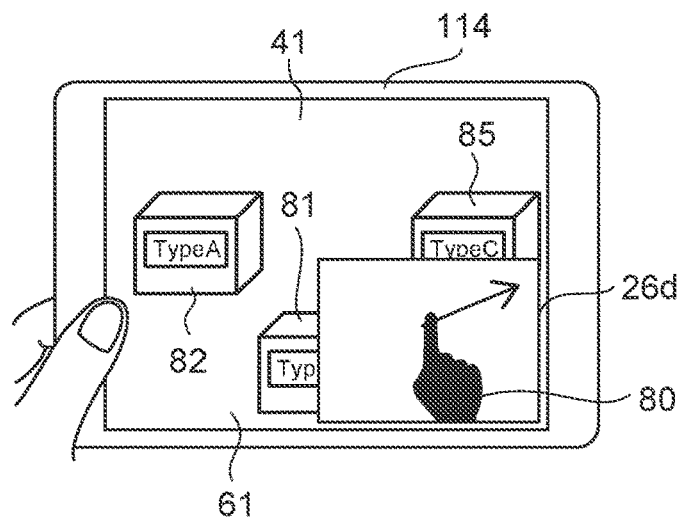
Figure 23C:
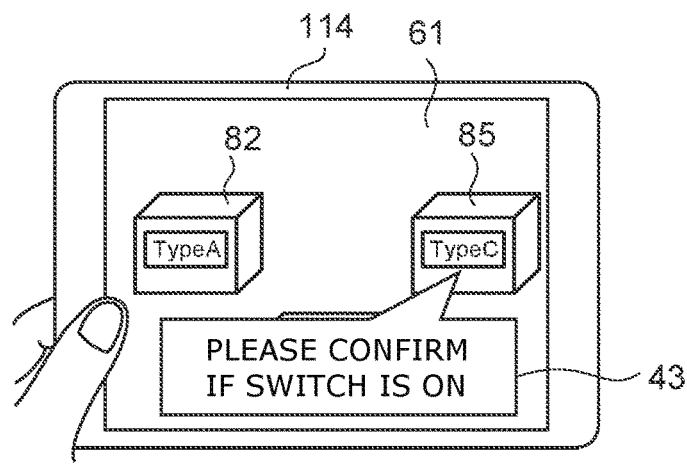

FIG. 23A to FIG. 23C are schematic views showing display results of the associated information according to the fifth embodiment.

FIG. 23A shows the display result of the associated information prior to the operation.

FIG. 23B shows the screen during the operation.

FIG. 23C shows the display result of the associated information after the operation.

As shown in FIG. 23A to FIG. 23C, when the object image of interest is modified to the fifth image 85 by the operation input unit 26, the display controller 24 displays the third associated information 43 associated with the fifth image 85 superimposed onto the first picture 61.

On the other hand, when the object image of interest is modified to the second image 82 by the operation input unit 26, the display controller 24 displays the second associated information 42 associated with the second image 82 superimposed onto the first picture 61.

Various realization methods may be considered as the method for selecting the object image of interest by the operation input unit 26 such as a method for selecting the object image of interest by direct touch of the object image on the screen, a method for selecting the object image of interest by a toggle operation, a method for selecting the object image of interest according to the length of a drag operation for multiple object images in the same direction, etc.

Thus, according to the embodiment, by including an operation input unit by which the operator independently modifies the object image of interest, the display content of the associated information can be switched at the timing when it is desired to end the continuous display of the associated information. Thereby, an easily-viewable display of the associated information is possible.

Sixth Embodiment

Figure 24:
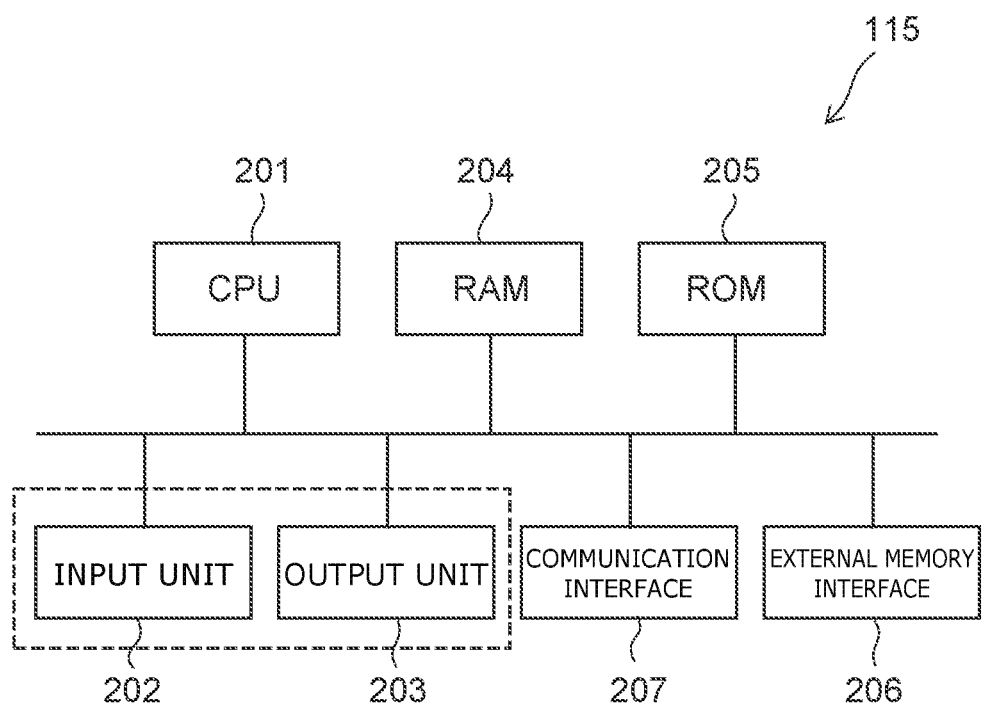
FIG. 24 is a block diagram showing an information processing device according to a sixth embodiment.

FIG. 24 is a block diagram showing an information processing device according to a sixth embodiment.

The information processing device 115 according to the embodiment is realizable by various devices such as a desktop or laptop general-purpose computer, a portable general-purpose computer, other portable information devices, an information device that includes an imaging device, a smartphone, other information processing devices, etc.

As shown in FIG. 24, as a configuration example of hardware, the information processing device 115 of the embodiment includes a CPU 201, an input unit 202, an output unit 203, RAM 204, ROM 205, an external memory interface 206, and a communication interface 207.

It is possible to execute the instructions of the processing methods of the embodiment described above based on a program which is software. It is also possible to obtain effects similar to the effects of the information processing device of the embodiment described above by the general-purpose computer system pre-storing the program and reading the program. The instructions described in the embodiment described above are recorded, as a program that can cause the execution by a computer, in a magnetic disk (a flexible disk, a hard disk, etc.), an optical disk (CD-ROM, CD-R, CD-RW, DVD-ROM, DVD±R, DVD±RW, etc.), semiconductor memory, or similar recording media. The storage format of the recording medium may have any form as long as the recording medium is readable by a computer or an embedded system. The computer can realize an operation similar to that of the information processing device of the embodiment described above based on the program by reading the program from the recording medium and executing the instructions recited in the program using the CPU. Of course, the computer may perform the acquiring or reading via a network when acquiring or reading the program.

Database management software or the OS (operating system) operating on the computer, MW (middleware) operating on a network, etc., may execute a portion of the processing for realizing the embodiment based on the instructions of the program installed in the computer or the embedded system from the recording medium.

The recording medium of the embodiment is not limited to a recording medium that is independent of the computer or the embedded system; and the recording medium of the embodiment also includes a recording medium that stores or temporarily stores a downloaded program transmitted by a LAN, the Internet, etc. The recording medium is not limited to one type; and the recording medium of the embodiment also includes the case where the processing of the embodiment is executed from multiple recording media. The configuration of the recording medium may be any configuration.

The computer or the embedded system of the embodiment executes the processing of the embodiment based on the program stored in the recording medium and may have any configuration such as a device made of one of a personal computer, a microcomputer, or the like, a system in which multiple devices are connected by a network, etc.

The computer of the embodiment is not limited to a personal computer, also includes a processor included in an information processing device, a microcomputer, etc., and generally refers to devices and apparatuses that can realize the functions of the embodiment by using a program.

According to the embodiments, an information processing device, an information processing method, and an information processing program can be provided in which easily-viewable associated information associated with an object is displayable.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in information processing device such as acquisitors and processors, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all information processing device, all information processing method, and all information processing program practicable by an appropriate design modification by one skilled in the art based on the information processing device, the information processing method, and the information processing program described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An information processing device, comprising:
processing circuitry configured to:
acquire a first picture captured at a first time, the first picture including a first image of a first object and a second image of a second object;
acquire a second picture captured at a second time later than the first time, the second picture including a third image of the first object and a fourth image of the second object, a position of the third image in the second picture being different from a position of the first image in the first picture, and a position of the fourth image in the second picture being different from a position of the second image in the first picture;
generate first data for displaying first associated information superimposed onto the first picture, the first associated information corresponding to the first object;
generate second data for displaying the first associated information corresponding to the first object superimposed onto the second picture when a change between a first positional relationship of the second image and a second positional relationship of the fourth image corresponds to a first state, the first positional relationship being a relative positional relationship having the first image as a reference, the second positional relationship being a relative positional relationship having the third image as a reference; and
generate third data when the change between the first positional relationship and the second positional relationship corresponds to a second state, the change for the first state being smaller than the change for the second state, the third data being different from the second data and the third data corresponding to the second object, wherein
the first data, the second data, and the third data are for display to a user, and
the position of the first and second images in the first picture and the position of the third and fourth images in the second picture are changeable in dependence on a position of the user.

2. The device according to claim 1, wherein
the processing circuitry is configured to:
calculate the first positional relationship based on a first relative coordinate system, the first relative coordinate system having a first position inside the first image as a center; and
calculate the second positional relationship based on a second relative coordinate system, the second relative coordinate system having a second position inside the third image as a center.

3. The device according to claim 2, wherein
the first relative coordinate system includes a first axis and a second axis, the first axis passing through the first position and extending in a first direction, the second axis passing through the first position and extending in a second direction, the second direction intersecting the first direction,
the first positional relationship includes a first orientation and a second orientation, the first orientation being an orientation of a third direction along the first axis, the second orientation being the orientation of the third direction along the second axis, the third direction being from the first image toward a second image of the second object in the first picture,
the second relative coordinate system includes a third axis and a fourth axis, the third axis passing through the second position and extending in the first direction, the fourth axis passing through the second position and extending in the second direction,
the second positional relationship includes a third orientation and a fourth orientation, the third orientation being an orientation of a fourth direction along the third axis, the fourth orientation being the orientation of the fourth direction along the fourth axis, the fourth direction being from the third image toward a fourth image different from the third image in the second picture, and
the processing circuitry being configured to determine whether or not a state corresponds to the first state by comparing the first orientation to the third orientation and comparing the second orientation to the fourth orientation.

4. The device according to claim 3, wherein the first state includes the first orientation being the same as the third orientation, and the second orientation being the same as the fourth orientation.

5. The device according to claim 1, wherein
the processing circuitry is configured to recognize the first image and the second image, and recognize the third image and the fourth image,
the third image is the same as the first image, and
the fourth image is the same as the second image.

6. The device according to claim 5, wherein the processing circuitry is configured to recognize at least one of a character, a shape of an object, or a human face.

7. The device according to claim 1, wherein the processing circuitry is configured to derive the first positional relationship.

8. The device according to claim 7, wherein the deriving includes deriving the first positional relationship when a state is continued for a prescribed amount of time, the state includes a distance between a center of the first image and a center of the first picture being shorter than a distance between a center of the second image and the center of the first picture.

9. The device according to claim 1, wherein
the second image is positioned within a range from a position of the first image, the range being constant, and
the fourth image is positioned within the range from a position of the third image.

10. The device according to claim 1, wherein
the first picture further includes a fifth image of a third object,
the second picture further includes a sixth image different from the third image and the fourth image, and
the processing circuitry is configured to:
generate fourth data for displaying the first associated information superimposed onto the first picture, and
generate fifth data when a state of the change corresponds to the first state and when a state of a change between a third positional relationship of the fifth image and a fourth positional relationship of the sixth image corresponds to a third state, the fifth data for displaying the first associated information superimposed onto the second picture, the third positional relationship being a relative positional relationship having the first image as a reference, the fourth positional relationship being a relative positional relationship having the third image as a reference.

11. The device according to claim 1, wherein the processing circuitry is configured to modify the reference of the first positional relationship from the first image to the second image.

12. The device according to claim 11, wherein the modifying further includes generating fourth data for displaying second associated information superimposed onto the first picture, the second associated information being associated with the second image.

13. The device according to claim 11, further comprising an operation input unit,
the modifying being based on an operation input received by the operation input unit.

14. An information processing method, comprising:
acquiring a first picture captured at a first time, the first picture including a first image of a first object and a second image of a second object;
acquiring a second picture captured at a second time later than the first time, the second picture including a third image of the first object and a fourth image of the second object, a position of the third image in the second picture being different from a position of the first image in the first picture, and a position of the fourth image in the second picture being different from a position of the second image in the first picture;
generating first data for displaying first associated information superimposed onto the first picture, the first associated information corresponding to the first object;
generating second data for displaying the first associated information corresponding to the first object superimposed onto the second picture when a change between a first positional relationship of the second image and a second positional relationship of the fourth image corresponds to a first state, the first positional relationship being a relative positional relationship having the first image as a reference, the second positional relationship being a relative positional relationship having the third image as a reference; and
generating third data when the change between the first positional relationship and the second positional relationship corresponds to a second state, the change for the first state being smaller than the change for the second state, the third data being different from the second data and the third data corresponding to the second object, wherein
the first data, the second data, and the third data are for display to a user, and
the position of the first and second images in the first picture and the position of the third and fourth images in the second picture are changeable in dependence on a position of the user.

* * * * *